(12) United States Patent
Bench et al.

(10) Patent No.: US 10,495,730 B1
(45) Date of Patent: Dec. 3, 2019

(54) PHASE AGNOSTIC MONOPULSE TRACKING

(71) Applicant: L-3 Communications Corp., New York, NY (US)

(72) Inventors: Jeffrey B Bench, Lehi, UT (US); Sy Prestwich, Riverton, UT (US)

(73) Assignee: L-3 Communications Corp., New York, NY (US)

( * ) Notice: Subject to any disclaimer, the term of this patent is extended or adjusted under 35 U.S.C. 154(b) by 428 days.

(21) Appl. No.: 15/486,554

(22) Filed: Apr. 13, 2017

(51) Int. Cl.
*G01S 7/28* (2006.01)
*G01S 13/66* (2006.01)
*G01S 13/44* (2006.01)

(52) U.S. Cl.
CPC .......... *G01S 7/2813* (2013.01); *G01S 13/44* (2013.01); *G01S 13/66* (2013.01)

(58) Field of Classification Search
CPC .. G01S 13/44–449; G01S 13/66; G01S 13/68; G01S 13/685; G01S 13/70; G01S 13/72; G01S 13/726
See application file for complete search history.

(56) References Cited

U.S. PATENT DOCUMENTS

| | | | | |
|---|---|---|---|---|
| 3,772,695 A * | 11/1973 | Hoffman | ............... | G01S 13/685 342/77 |
| 3,943,512 A * | 3/1976 | Dempsey | ............. | G01S 7/2813 342/80 |
| 4,021,801 A * | 5/1977 | Chernick | .............. | F41G 7/2246 342/89 |
| 4,042,927 A * | 8/1977 | Helms | ....................... | G01S 3/32 342/13 |
| 5,047,781 A * | 9/1991 | Bleakney | ............ | G01S 13/4418 342/149 |
| 5,173,702 A * | 12/1992 | Young | ....................... | G01S 7/36 342/17 |
| 5,371,506 A * | 12/1994 | Yu | ............................. | G01S 7/36 342/149 |
| 5,402,129 A * | 3/1995 | Gellner | ................. | G01S 13/348 342/70 |
| 5,815,112 A * | 9/1998 | Sasaki | ..................... | G01S 13/87 342/113 |
| 5,926,128 A * | 7/1999 | Brash | ..................... | G01S 3/325 342/149 |
| 6,801,156 B1 * | 10/2004 | Wasiewicz | ............ | G01S 7/4052 342/140 |

(Continued)

*Primary Examiner* — Peter M Bythrow
(74) *Attorney, Agent, or Firm* — Kirton McConkie; Brian Tucker

(57) ABSTRACT

A monopulse antenna system can include a monopulse detector assembly (MDA) that is configured to steer a monopulse antenna based on the magnitude of an elevation ratio or azimuth ratio independently of the phase of the ratio. To prevent the direction of the monopulse antenna from being changed too frequently, the MDA can employ ratio bins to determine when the direction of the monopulse antenna should be reversed. Also, the MDA may enforce a hold period during which a change in the direction of the monopulse antenna will not be performed. The MDA can employ one or more mapping equations to generate a steering signal as a function of the magnitude of the ratio. The mapping equations can be selectively employed based on whether tracking is being performed at or near the ratio null.

20 Claims, 20 Drawing Sheets

(56) References Cited

U.S. PATENT DOCUMENTS

| | | | |
|---|---|---|---|
| 2006/0077097 A1* | 4/2006 | Dybdal | G01S 3/325 342/359 |
| 2006/0158369 A1* | 7/2006 | Shinoda | G01S 7/2925 342/70 |
| 2010/0123617 A1* | 5/2010 | Yu | G01S 13/4418 342/149 |
| 2011/0102242 A1* | 5/2011 | Takeya | G01S 7/02 342/105 |
| 2013/0328714 A1* | 12/2013 | Turner | G01S 13/4427 342/74 |
| 2015/0084810 A1* | 3/2015 | Lee | G01S 7/28 342/154 |
| 2018/0259641 A1* | 9/2018 | Vacanti | G01S 13/953 |

* cited by examiner

PHASE AGNOSTIC MONOPULSE TRACKING

CROSS-REFERENCE TO RELATED APPLICATIONS

N/A

BACKGROUND

A monopulse antenna system is commonly used to implement radar tracking or to track intentional radiators. As its name implies, a monopulse antenna system employs a single pulse to identify the presence of an object in the field of view. This is possible due to the use of multiple antennas which can detect angle information from the arriving signal.

FIG. 1 illustrates an example block diagram of a typical dual-axis monopulse antenna system. As shown, a dual-axis monopulse antenna system may include four individual antennas (A, B, C, and D) each of which are driven by the same arriving signal. If an object is in the field of view of the monopulse antenna system, each individual antenna will receive the reflected (or transmitted) signal. These received signals (which are referred to as A, B, C, and D respectively) are then fed to a comparator network. Although not shown, some intermediate processing may be performed on the received signals prior to inputting them to the comparator network.

Due primarily to the slight differences in the positions/orientations of the individual antennas, the characteristics of the received signals will vary. The comparator network can detect these variations to allow the relative location of the object with respect to the boresight axis to be determined. In particular, the comparator network can generate three tracking channels: (1) a sum ($\Sigma$) of the four received signals; (2) an azimuth difference ($\Delta_{az}$); and (3) an elevation difference ($\Delta_{el}$). As one of skill in the art would understand how these tracking channels can be employed to identify and track the position of an object, no further description will be provided.

As with most antennas, monopulse antennas produce a mainlobe (or main beam) and various sidelobes. In many situations, it will be possible to detect the presence of an object (or intentional radiator) whenever the object is positioned within the mainlobe or within one of the sidelobes due to the relatively high gain of some sidelobes. Therefore, even if the monopulse antenna is not pointed directly at the object, it may still receive a strong enough signal to detect the object's presence. However, if the object is within a sidelobe, and if the comparator network detects a sum channel peak or a difference channel null, the antenna will incorrectly assume that it is pointing directly at the object.

In typical monopulse antenna systems, an open-loop GPS and navigation data backbone is employed to perform coarse tracking. In other words, GPS data of the object to be tracked is supplied to the monopulse antenna system to allow the monopulse antenna system to initially point the antenna in the general direction of the object. Using GPS data in this way also requires that the antenna be physically oriented with respect to true north which can be a tedious process.

Additionally, as part of this tracking system, a modem lock signal will typically be employed as an indicator to the system that tracking is occurring. At sufficiently large target ranges, because the mainlobe gain is larger than the sidelobe gains, a SNR sufficient to establish the modem lock should only exist when the object is within the antenna's mainlobe. However, the fact that a modem lock can be established does not necessarily imply that the object is within the antenna's mainlobe. In many situations, an adequate SNR for establishing a modem lock may exist even though the object is positioned within the antenna's sidelobe. In such situations, the monopulse antenna system will track the object using a sidelobe when the desired outcome is to track within the mainlobe. This increases the risk of dropping the link due to marginal signal-to-noise ratio performance as the target moves away. Accordingly, a modem lock is a poor indicator of mainlobe tracking.

BRIEF SUMMARY

The present invention extends to techniques for tracking in a monopulse antenna system. A monopulse antenna system can include a monopulse detector assembly (MDA) that is configured to steer a monopulse antenna based on the magnitude of an elevation ratio or azimuth ratio independently of the phase of the ratio. When it is determined that the current ratio is larger than previous ratios, a steering signal will cause the direction of a monopulse antenna of the monopulse antenna system to be reversed. To prevent the direction of the monopulse antenna from being reversed too frequently, the MDA can employ ratio bins to determine when the direction of the monopulse antenna should be reversed. Also, the MDA may enforce a hold period during which a reversal in the direction of the monopulse antenna will not be performed. The MDA can employ one or more mapping equations to generate a steering signal as a function of the magnitude of the ratio. The mapping equations can be selectively employed based on whether tracking is being performed at or near the ratio null.

In one embodiment, the present invention is implemented as a method for tracking in a monopulse antenna system using a magnitude of a ratio. A current magnitude of a ratio can be identified, the ratio being generated from a sum and difference channel of a monopulse antenna system. A current ratio bin in which the current magnitude falls can also be identified. When it is determined that the current ratio bin is larger than a previous ratio bin in which a previous magnitude of the ratio fell, a steering signal that will cause a direction of a monopulse antenna of the monopulse antenna system to be reversed can be generated.

In another embodiment, the present invention is implemented as a method for generating a steering signal in a monopulse antenna system. A magnitude of a ratio can be calculated, the ratio being generated from a sum and difference channel of a monopulse antenna system. The magnitude is employed as an input to a mapping equation to generate a magnitude of a steering signal. The steering signal is then output to a monopulse antenna to cause the monopulse antenna to be steered in accordance with the magnitude of the steering signal.

In another embodiment, the present invention is implemented as a monopulse antenna system that includes a monopulse antenna and a monopulse detector assembly (MDA) that generates a ratio based on sum and difference channels that are generated from outputs of the monopulse antenna. The MDA is configured to generate steering signals to steer the monopulse antenna based on a magnitude of the ratio.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
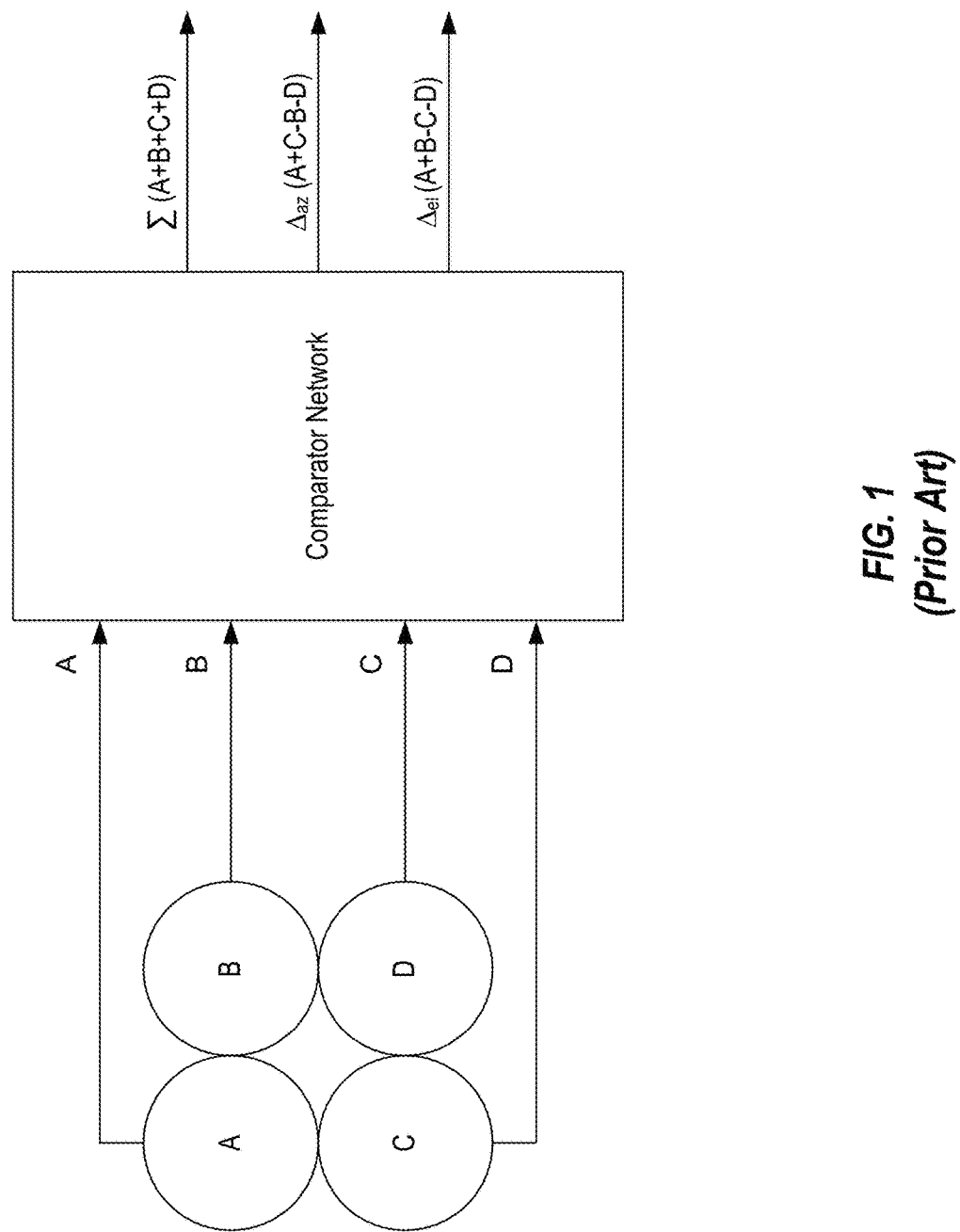
FIG. 1 provides a block diagram of a typical monopulse antenna system.
Figure 2:
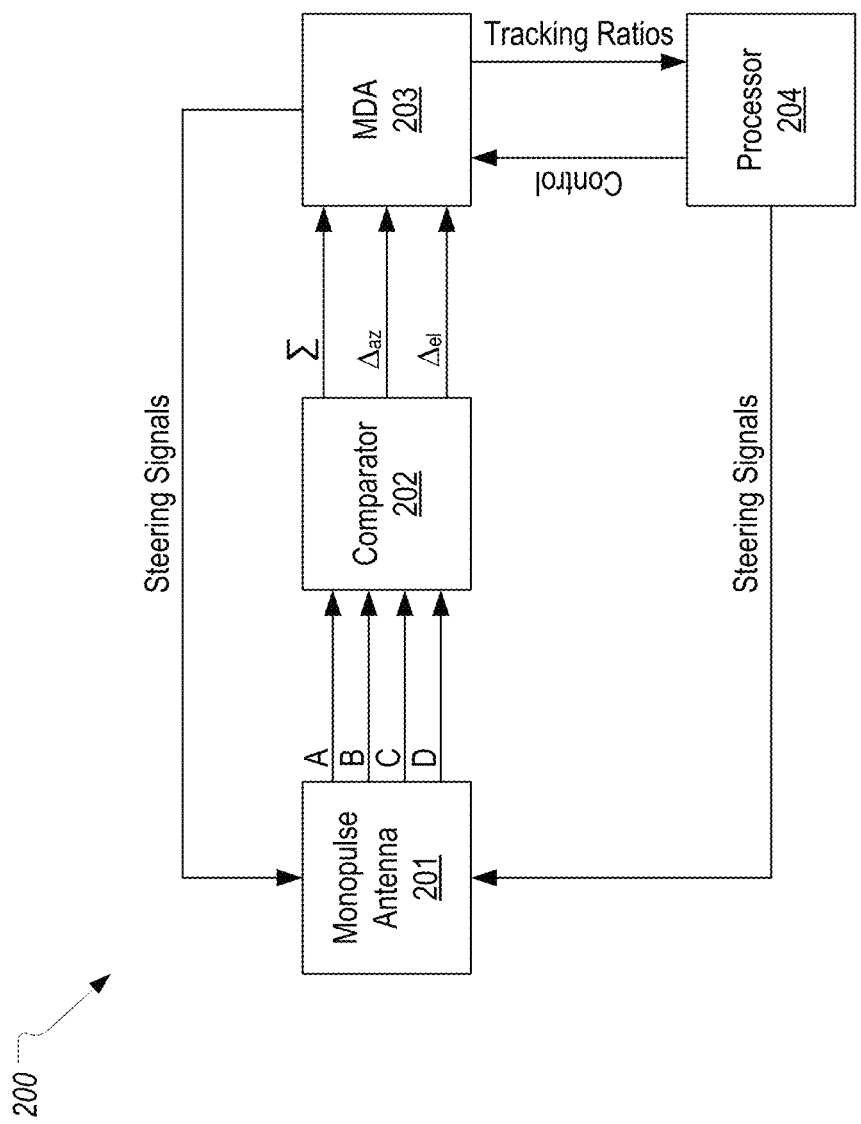
FIG. 2 illustrates a block diagram of a monopulse antenna system that is configured in accordance with one or more embodiments of the present invention.

FIG. 2 provides a block diagram of the internal circuitry of a monopulse antenna system 200 that can be configured to perform the techniques of the present invention. Monopulse antenna system 200 includes a monopulse antenna 201 that is configured to produce signals A, B, C, and D which are then fed to a comparator 202 to generate the sum ($\Sigma$) azimuth difference ($\Delta_{az}$), and elevation difference ($\Delta_{el}$) channels as is known in the art. The three channels produced by comparator 202 are then fed into a monopulse detector assembly (MDA) 203 which produces two ratios from the channels: (1) an azimuth ratio (Ratio$_{az}$) indicative of the azimuth error (i.e., an object's azimuth angle of deviation from the boresight axis); and (2) an elevation ratio (Ratio$_{el}$) indicative of the elevation error (i.e., the object's elevation angle of deviation from the boresight axis). In some embodiments, these ratios can be generated in accordance with the following equations:

$$\text{Ratio}_{az} = \frac{\Delta_{az}}{\Sigma}$$

$$\text{Ratio}_{el} = \frac{\Delta_{el}}{\Sigma}$$

MDA 203 can be configured to implement the techniques of the present invention to ensure that monopulse antenna 201 is oriented such that the object to be tracked will be positioned within the mainlobe rather than a sidelobe. In other words, MDA 203 can generate steering signals to control the orientation of monopulse antenna 201 in accordance with the techniques of the present invention as will be described below. Monopulse antenna system 200 may also typically include a processor 204 which can interface with MDA 203 to provide control signals to and to receive state and tracking information from MDA 203. Also, processor 204 can be configured to interface with monopulse antenna 201 for the purpose of providing steering signals. Although not shown, monopulse antenna system 200 may include a steering component with which MDA 203 and processor 204 interface for purposes of steering monopulse antenna 201.

By way of overview, the present invention utilizes a series of tests during the steering of the monopulse antenna to ensure that tracking is only performed on the mainlobe. Initially, the monopulse antenna can be steered in an open loop scan mode. Open loop refers to the fact that the monopulse antenna is steered independently of the RF signal it receives. For example, while in open loop scan mode, the monopulse antenna can be steered relatively quickly along a spiral or zig zag pattern in an attempt to locate an object. Processor 204 can provide the steering signals to monopulse antenna 201 when in the open loop scan mode. In contrast, closed loop scanning refers to steering the antenna based on the azimuth and elevation tracking errors that are produced from the channel measurements. Therefore, closed-loop tracking often involves relatively slow/small movements in comparison to open loop scanning. Because closed loop scanning is based on the tracking channels, MDA 203 can be tasked with steering monopulse antenna 201 during closed loop scanning. In either case, the monopulse antenna can be steered either mechanically (i.e., by physically moving the monopulse antenna) or electrically (e.g., by using phased array techniques).

Continuing the overview, while processor 204 steers monopulse antenna 201 in open loop scanning, MDA 203 can process the three tracking channels to determine whether an object appears in the field of view of monopulse antenna 201 (e.g., based on a comparison of the sum channel power to the difference channel powers). Once MDA 203 detects that an object is present within the field of view (defined as the initial power-level test conditions), control of the steering can be turned over to MDA 203 to allow MDA 203 to determine whether the object is located within the mainlobe of monopulse antenna 201. If MDA 203 determines that the object is within the mainlobe, it declares track lock and continues to track the object. However, if MDA 203 determines that the object is within a sidelobe, it can pass steering control back to processor 204 to recommence open loop scanning. This process can be repeated as necessary until the monopulse antenna 201 is steered towards the object such that tracking can occur on the mainlobe.

Figure 3A:
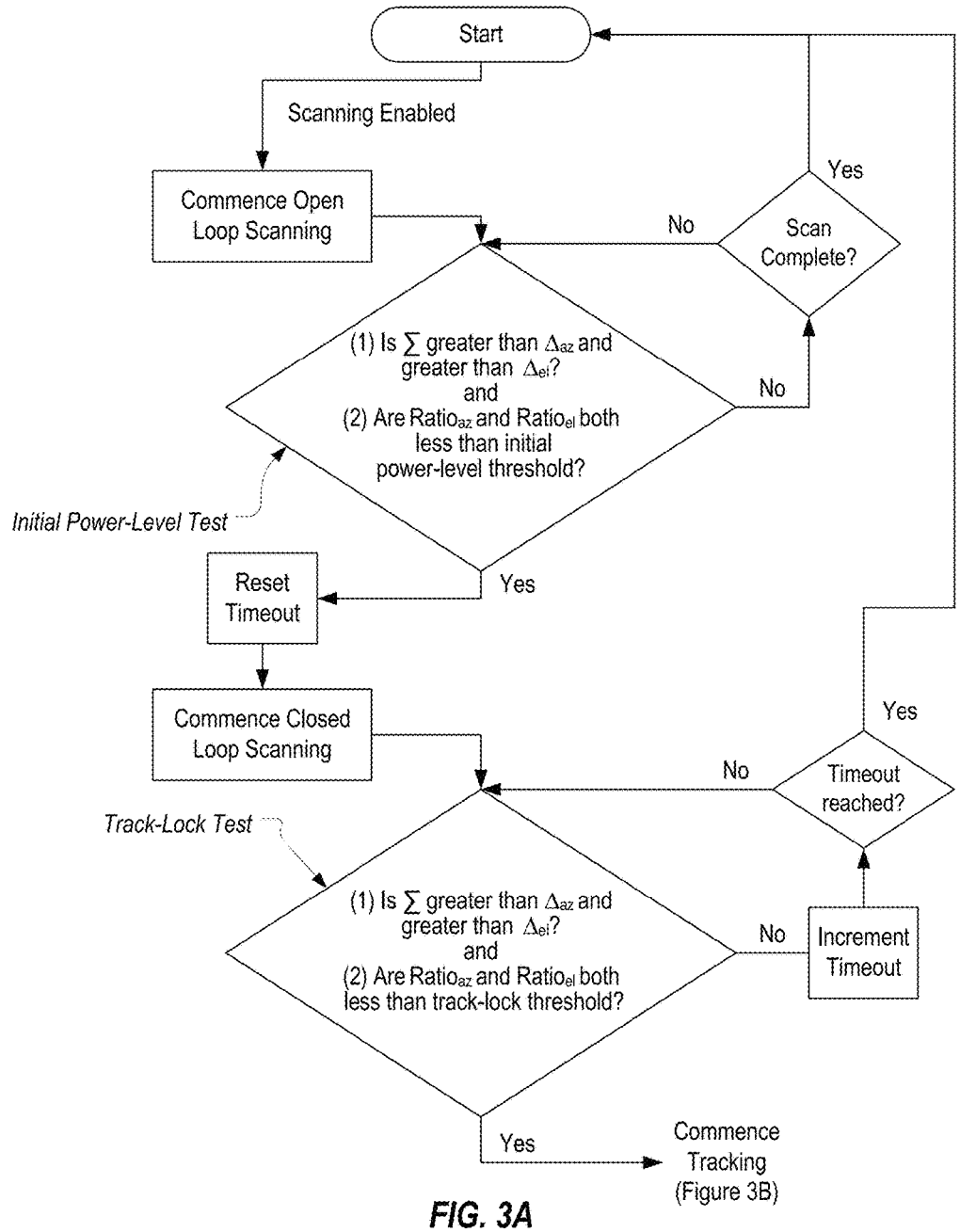
FIGS. 3A and 3B illustrate a flow chart of a mainlobe detection process.
Figure 3B:
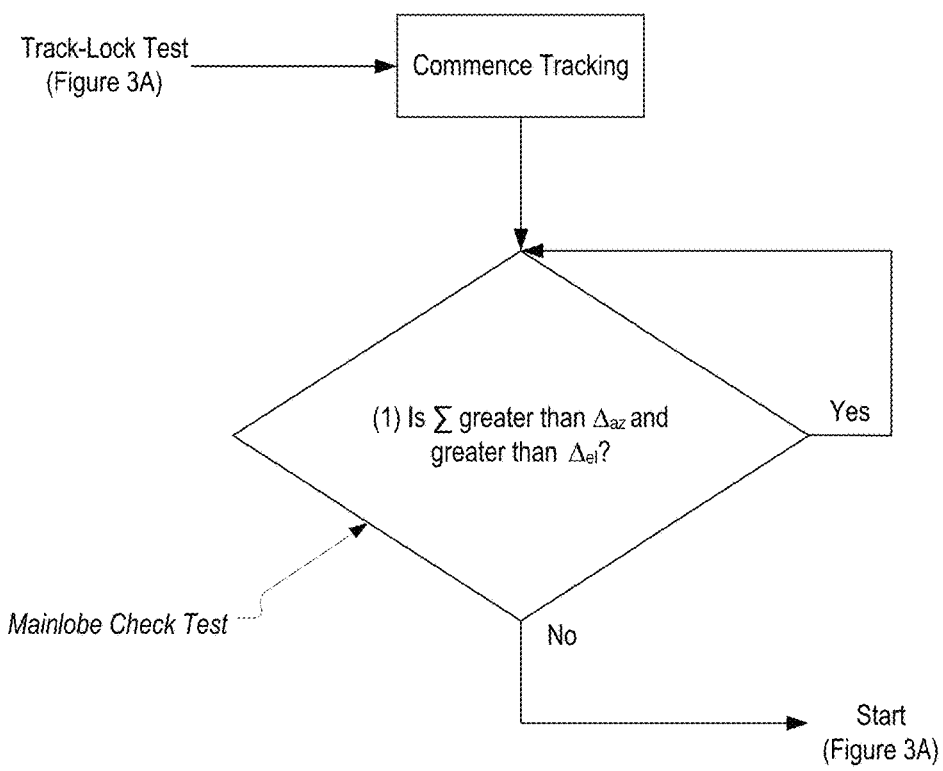

FIGS. 3A and 3B provide a flowchart of this mainlobe detection process. As indicated above, MDA 203 is primarily tasked with performing the steps of this process. Therefore, FIGS. 3A and 3B generally represent the steps performed by MDA 203. However, processor 204 can also be involved in providing various control inputs and in monitoring the state of the process. The interactions that may occur between MDA 203 and processor 204 are described more fully below with respect to the state diagram of FIG. 4.

The mainlobe detection process can commence when open loop scanning is enabled. For example, processor 204 (or more specifically, software executing on processor 204) could instruct MDA 203 to commence the mainlobe detection process. When open loop scanning is commenced, an initial power-level test can be iteratively performed by MDA 203. As shown, this initial power-level test can include (1) determining whether the sum channel power is greater than each of the difference channel powers. In some embodiments, this initial power-level test may also include (2) determining whether the azimuth ratio and the elevation ratio are each less than an initial power-level threshold.

When an object is present within the field of view of monopulse antenna 201, the sum channel power will exceed both the azimuth channel power and the elevation channel power. Therefore, when MDA 203 detects that this condition is met, it can transition into a closed loop scanning mode. The azimuth and elevation ratios represent the ratio of the difference between the sum channel power and the azimuth and elevation channel powers respectively and can therefore serve to define a threshold for when the initial power-level condition will cause a transition into the closed loop scanning mode. In other words, this second condition of the initial power-level test can prevent closed loop scanning from being performed when the sum channel power only slightly exceeds the difference channel powers.

This initial power-level threshold (as well as the track-lock threshold described below) can be a configurable parameter so that the "sensitivity" of the process can be fine-tuned for a given environment. For example, in environments when multipath reflections may occur (e.g., when monopulse antenna system 200 is positioned above the object to be tracked and will therefore receive reflections from the earth's surface), a larger value for the initial power-level threshold may be desirable.

As mentioned above, the transition from open loop scanning to closed loop scanning involves allowing MDA 203 to control the steering of monopulse antenna 201 based on the RF signal received by the antenna (i.e., based on the values of the three channels). The fact that the initial power-level test has succeeded indicates that an object is present within a lobe of monopulse antenna 201. However, at this point, it is still unknown whether the object is within the mainlobe or within one of the sidelobes.

Figures 5A, 5B:
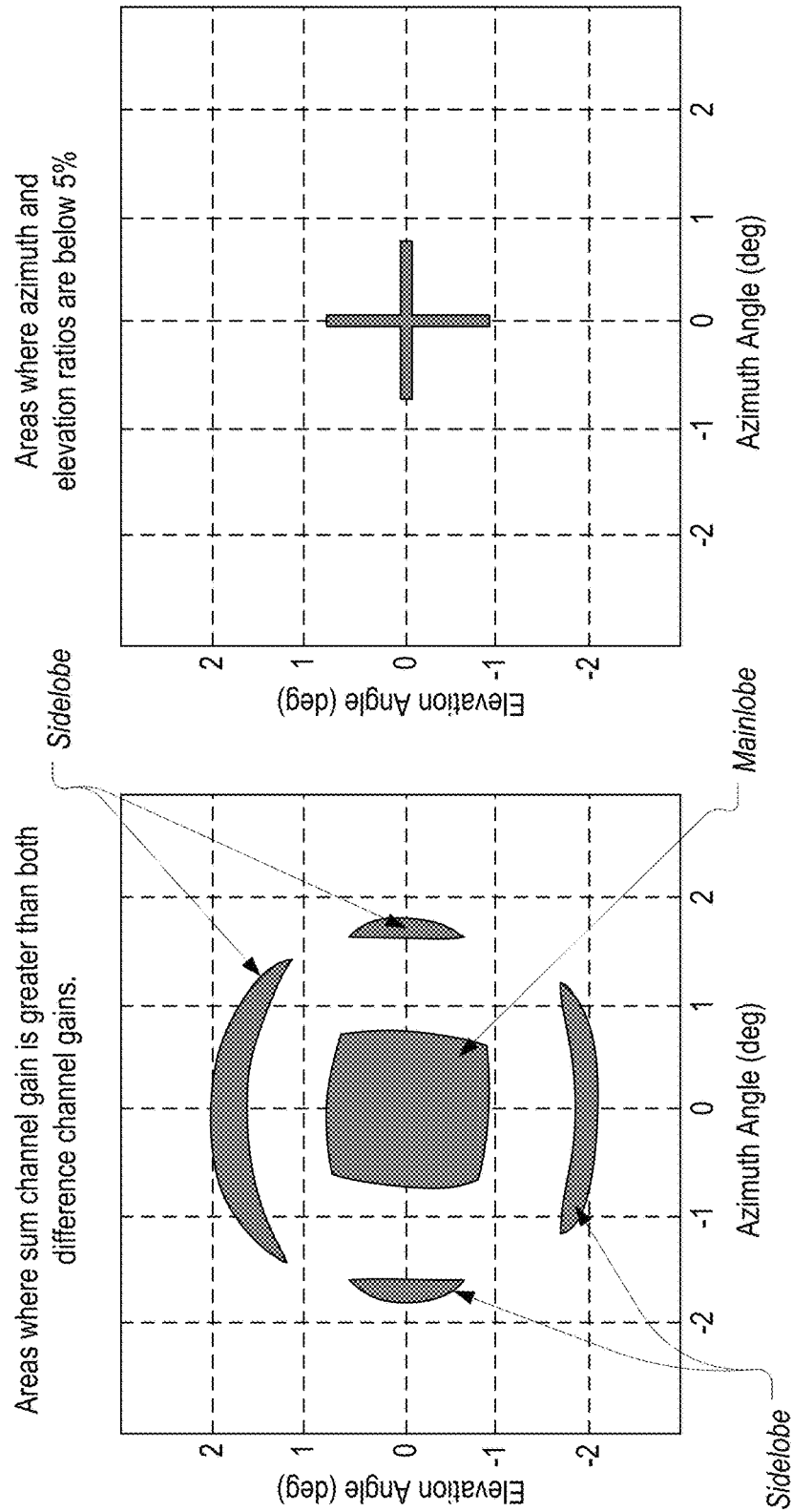
FIGS. 5A-5C provide various charts representing how the mainlobe detection process can detect the mainlobe and the process results unique to the mainlobe.

FIG. 5A provides a plot identifying the areas where the sum channel gain exceeds both difference channel gains. This plot can be interpreted as the composite (including sum, azimuth, and elevation channels) gain profile that would be seen when looking directly at monopulse antenna 201. Accordingly, the mainlobe is centered at 0° azimuth and 0° elevation and a number of sidelobes are positioned around the mainlobe as indicated. It is noted that this plot is simplified for illustrative purposes to remove various weaker sidelobes. In this example, if an object was positioned within the mainlobe or any of the sidelobes, the received signal would exhibit characteristics that would cause the initial power-level test to pass. In other words, even when the object is in one of the labeled sidelobes, the sum channel power would still exceed both difference channel powers. Both the azimuth and elevation ratios should also be below the initial power-level threshold when the object is in one of the labeled sidelobes. Accordingly, the initial power-level test functions as a "power test" for identifying when an object is located within a lobe.

To ensure that MDA 203 does not commence tracking the object when the object is within a sidelobe, MDA 203 can be configured to perform two additional tests. Initially, upon commencing closed loop scanning, MDA 203 can perform a track-lock test. As with the initial power-level test, the track-lock test can involve: (1) ensuring that the sum channel power remains greater than both the difference channel powers; and (2) determining whether the azimuth ratio and the elevation ratio are each less than a track-lock threshold. This track-lock threshold can be substantially less than the initial power-level threshold in order to increase confidence that the object is within the mainlobe. By way of example only, the initial power-level threshold may be 50% and the track-lock threshold may be 5%. However, as indicated above, these thresholds can be configurable to fine-tune the system for a particular environment.

This track-lock test is iteratively performed while MDA 203 steers monopulse antenna 201 based on the received values of the tracking channels. In other words, MDA 203 makes small adjustments to the orientation of monopulse antenna 201 to attempt to center the object within the lobe. As this centering is performed, the sum channel power relative to the difference channel powers should increase (i.e., MDA 203 will steer monopulse antenna 201 to minimize the azimuth and elevation ratios).

Each time the track-lock test is performed and fails, the timeout parameter can be incremented. The timeout parameter is used to set a test parameter to determine if the system will pass the test in a suitable amount of time. When testing near the mainlobe, the test will always pass under a certain time period. However, for locations other than the mainlobe, the test may never pass, but closed-loop tracking would continue were it not for a timeout period. If the timeout value reaches a particular value (e.g., 100), it can be assumed that the object is within a sidelobe, or certainly not in the mainlobe. More specifically, if the object is within a sidelobe, there may be no orientation within this sidelobe that will cause the track-lock test to pass. As a result, MDA 203 can pass steering control back to processor 204 to recommence the open loop scanning process to attempt to locate the mainlobe. In contrast, if the track-lock test passes, it implies that the sum channel power greatly exceeds the difference channel powers, and, as such, the object may likely be within the mainlobe and tracking can be commenced.

FIG. 5B provides a plot illustrating the area where both the azimuth and elevation ratios are below the track-lock threshold (e.g., below 5%). As shown, in this case, the conditions of the track-lock test are met only within a small portion (the + shaped portion) of the mainlobe. Accordingly, if during open loop scanning, the object comes within one of the sidelobes and passes the initial power-level test, closed loop scanning will commence within that sidelobe. Because the ratios required by the track-lock test do not exist within the sidelobe, the track-lock test will eventually time out causing open loop scanning to be resumed. In contrast, if during open loop scanning, the object comes within the mainlobe, the subsequent closed loop scanning will cause monopulse antenna 201 to eventually be oriented directly towards the object (i.e., oriented so that the object is within the + shaped region of FIG. 5B) thereby causing the track-lock test to succeed.

The initial power-level and track-lock tests can be performed very quickly such that a number of closed loop scanning intervals can be performed in a relatively short amount of time. Therefore, even if the track-lock test is performed on a number of sidelobes prior to reaching the mainlobe, mainlobe tracking can ultimately be achieved in a reasonable amount of time. The values of the initial power-level and track-lock thresholds can be set to control how quickly this acquisition may occur.

In some embodiments, once the initial power-level and track-lock tests have passed, MDA 203 can commence tracking the object using the current values of the azimuth and elevation ratios. In some embodiments, this tracking can be performed in a "magnitude-only mode" in which the magnitudes alone of the azimuth and elevation ratios (or tracking error) are used to steer monopulse antenna 201 (i.e., tracking is performed independently of the phase). During this tracking, a mainlobe-check test can be continuously performed to ensure that the object remains within the mainlobe. As shown in FIG. 3B, this mainlobe-check test can be the same as the initial power-level condition of the initial power-level test, namely, whether the sum channel power remains greater than both the difference channel powers. If, during tracking, the object moves outside of the mainlobe, this mainlobe-check test will fail thereby causing MDA 203 to return steering control back to processor 204 which may resume the open loop scanning process in an attempt to again orient the mainlobe towards the object.

Even with a low value for the track-lock threshold, there may still be some very infrequent scenarios where the track-lock test will pass when the object is located within the sidelobe (e.g., when the target is relatively close to monopulse antenna 201 and strong receive signals are present). The discriminator for these circumstances is built-in to the inherent phase response of the antenna feed comparator network, and can only be exploited when in phase tracking mode. In other words, when closed-loop tracking attempts to pass the track-lock test, MDA 203 could be commanded to be run in either magnitude-only mode or phase mode for tracking. Only in phase tracking mode can the MDA discriminate against situations where the azimuth or elevation ratio magnitudes are less than the track-lock threshold when the target is actually on a sidelobe. As an overview, this phase tracking can employ the phase of the azimuth and elevation tracking ratios (as represented by the sign of the azimuth and elevation ratios) to steer monopulse antenna 201 towards a center of the mainlobe. Due to the differences between the phase pattern within the mainlobe and the phase patterns within the sidelobes, when an object is being tracked within a sidelobe, this phase tracking will cause monopulse antenna 201 to be steered away from the center of the sidelobe. This will ultimately cause the mainlobe check test to fail thereby causing open loop scanning to be resumed.

Figure 5C:
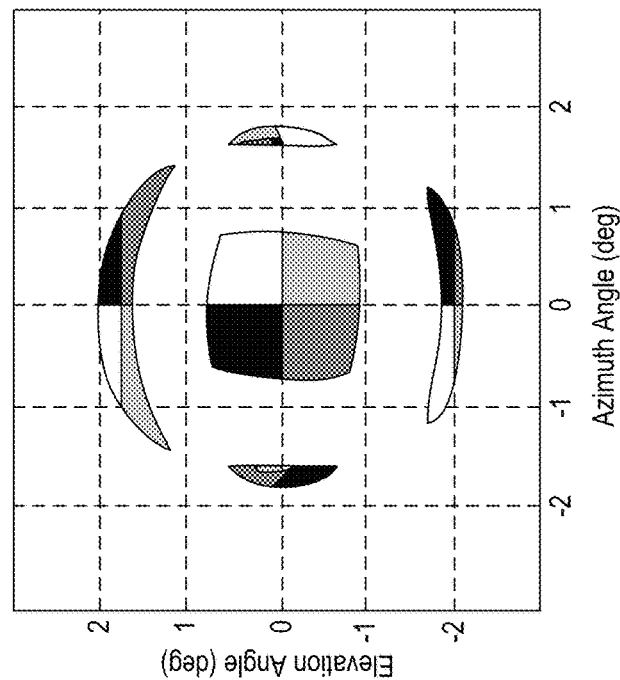

FIG. 5C provides a plot illustrating the phase pattern that exists within the mainlobe and the various sidelobes that are represented in FIG. 5A. As is known, each of the A, B, C, and D signals produced by a monopulse antenna will have a phase. In theory, if the object is located directly in the center of the mainlobe and the phase response of the monopulse antenna system is properly aligned, each of these signals will have the same phase. However, if the object's location is offset from this "zero phase" position, and phase is taken into account, the azimuth and elevation difference ratios can be either positive or negative. For example, if the object is located at 0.5 degrees azimuth, the phase differences in the A, B, C, and D signals may cause the azimuth difference ratio to be positive, while if the object is located at −0.5 degrees azimuth, the phase differences in the A, B, C, and D signals may cause the azimuth difference ratio to be negative. A similar transition in the phase may occur along the elevation axis.

MDA 203 can employ these azimuth and elevation phase transitions during tracking. More particularly, MDA 203 can steer monopulse antenna 201 based on the sign of the azimuth and elevation ratios (or equally based on the sign of the azimuth and elevation difference channels). With reference to FIG. 5C, if the tracked object is located in either of the right-sided quadrants (relative to the azimuth angle 0° reference), the azimuth ratio may have a non-zero positive value, and if the tracked object is located in either of the left-sided quadrants (relative to the azimuth angle 0° reference), the azimuth ratio may have a non-zero negative value. Similarly, if the tracked object is located in either of the top quadrants (relative to the elevation angle 0° reference), the elevation ratio may have a non-zero positive value, and if the tracked object is located in either of the bottom quadrants (relative to the elevation angle 0° reference), the elevation ratio may have a non-zero negative value. MDA 203 can be configured to steer monopulse antenna 201 based on the signs of these ratios. The tables below provide one example of how MDA 203 can be configured to steer monopulse antenna 201 when performing phase tracking. It is noted that the sign of the ratios will depend on how the azimuth and elevation difference channels are produced (e.g., whether the azimuth difference channel is produced as A+C−B−D or B+D−A−C) and therefore the steering directions are relative to how the difference channels are produced.

|  | Direction to Steer |
|---|---|
| Sign of Azimuth Ratio | |
| + | Right |
| − | Left |
| Sign of Elevation Ratio | |
| + | Up |
| − | Down |

As can be seen, based on these rules during phase tracking, MDA 203 will continuously steer monopulse antenna 201 to cause the object to be located at the phase transition point in each axis (i.e., where the azimuth and elevation ratios approach zero) which, in theory, should exist at the point where the ratios are minimized (i.e., at the point where the difference between the sum channel gain and the difference channel gains is maximized). Due to this tracking, monopulse antenna 201 will remain oriented properly towards the object such that the mainlobe-check test will repeatedly succeed.

Turning again to FIG. 5C, it is noted that the phase pattern within the sidelobes is not the same as the phase pattern within the mainlobe. For this reason, if phase tracking is being performed on a sidelobe, MDA 203 will cause monopulse antenna 201 to steer away from the object. This would force a failure during the mainlobe check test. For example, if the object is located within the top left (or white) quadrant of the upper sidelobe, the elevation and azimuth ratios will both have a positive sign. Based on the rules above, this will cause MDA 203 to steer monopulse antenna 201 in an upward and rightward direction. In other words, the signs of the ratios will cause MDA 203 to believe the object is above and to the right of the center point of the lobe when in fact the object is above and to the left of the center point. As a result, after MDA 203 steers monopulse antenna 201, the object will eventually be located outside the upper sidelobe where the sum channel power will not be greater than the difference channel powers thereby causing the mainlobe check test to fail. In this way, MDA 203 employs phase to cause the mainlobe check test to fail when tracking is performed on a sidelobe thereby causing open loop scanning to be resumed in order to locate the mainlobe.

In some embodiments, the track-lock test may include an additional condition which monitors the variation in the sum channel power. When on the mainlobe, there should, in theory, be very little variation in the sum channel power across readings. In contrast, when on a sidelobe, the sum channel power may vary substantially. MDA 203 can therefore record the sum channel power level at each sampling and use these recorded levels to verify whether the power level has varied in excess of some threshold (e.g., whether the sum channel power level has varied by more than 2 dB over a series of ten samples). If the sum channel power varies in excess of this threshold, the track-lock test can fail thereby causing open loop scanning to be resumed. This variance threshold can be a configurable parameter as with the other thresholds. For example, in multipath conditions or for a fast-moving target, the sum channel power may vary significantly by comparison when on the mainlobe. In such cases, the variance threshold can be set to a larger level to prevent the track-lock test from incorrectly failing. A primary benefit of employing the variance threshold in the track-lock condition is that it may cause the track-lock test to fail before the timeout has been reached. In this way, less time will be spent doing closed loop scanning within a sidelobe.

Figure 4:
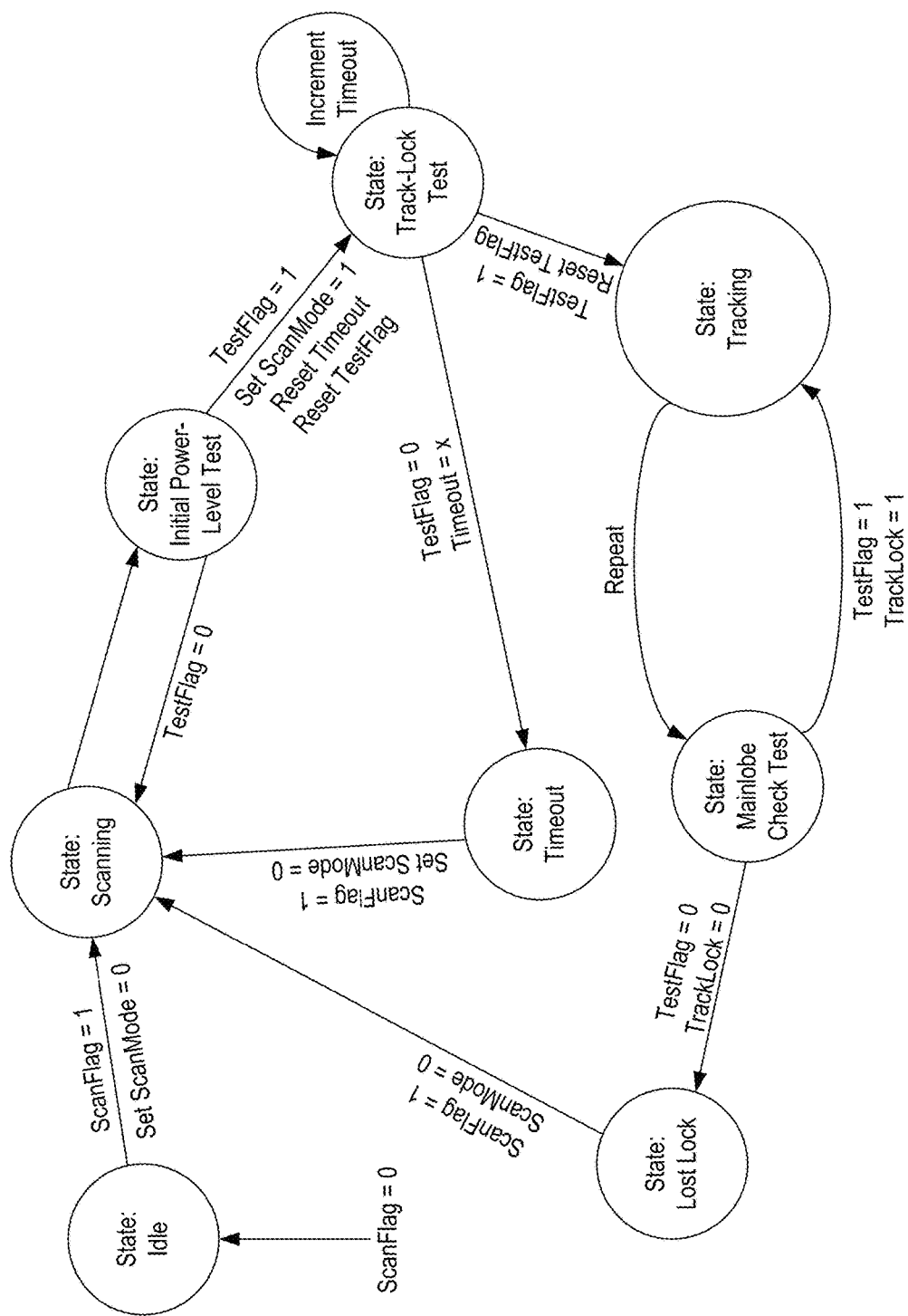
FIG. 4 provides a state diagram of the mainlobe detection process.

FIG. 4 illustrates a state diagram for the above described process and represents how MDA 203 and processor 204 can interact. A number of control and state parameters can be employed to enable processor 204 to monitor and control MDA 203 during the process. These parameters include a ScanFlag parameter which when set will enable the scanning process, a ScanMode parameter which defines whether open or closed loop scanning will be performed, a Timeout parameter which tracks the number of iterations of the track-lock test, a TestFlag parameter which identifies the success or failure of the current test, and a TrackLock parameter which represents whether the target is currently being tracked. In some embodiments, processor 204 can set the value of the ScanFlag and ScanMode parameter while MDA 203 can set the value of the TestFlag and TrackLock parameters as will be described below. This state diagram and the parameters are exemplary and are only intended to represent one way in which MDA 203 and processor 204 could be configured to interact.

Whenever the ScanFlag parameter is set to 0, monopulse antenna system 200 will be in an idle state (i.e., neither scanning nor tracking). Whenever it is desired to commence the mainlobe detection process, processor 204 can set the ScanFlag parameter to 1 thereby transitioning monopulse antenna system 200 into the scanning state. As part of this transition, processor 204 can set the ScanMode parameter to 0 thereby indicating that open loop scanning should be performed (i.e., instructing MDA 203 that it will not control the steering of antenna 201). As open loop scanning is commenced, the MDA 203 can commence performing the initial power-level test while open loop scanning is occurring.

Monopulse antenna system 200 will remain in the initial power-level test state until either the initial power-level test succeeds or the scan is completed. As long as the ScanFlag parameter remains set, the system may reset the scan and continue performing the scan pattern. In contrast, if the test succeeds, MDA 203 can set the TestFlag parameter to 1 thereby causing the system to transition into the track-lock test state. In response to the TestFlag parameter being set to 1, processor 204 can set the ScanMode parameter to 1 to indicate to MDA 203 that it should commence closed loop tracking. Also, the Timeout and TestFlag parameters can be reset so that they can be used during the track-lock test.

The track-lock test is performed in a similar manner as the initial power-level test. However, each time the track-lock test is performed, the Timeout parameter can be incremented. If the Timeout parameter reaches a defined value x, the system will transition into the timeout state. If the ScanFlag parameter remains set, processor 204 can set the ScanMode parameter to 0 to cause open loop scanning to be resumed and the process restarted. In contrast, if the track-lock test succeeds, MDA 203 can set the TestFlag parameter to 1 which will cause the system to transition into the tracking state. As part of this transition, the TestFlag parameter can again be reset.

Once in the tracking state, MDA 203 can commence tracking the object using one of the modes described above (magnitude-only or phase mode) or even a hybrid tracking mode (for the purpose of antenna feed phase correction) which will be described below. While tracking, the system will repeatedly check the mainlobe-check test state. If the mainlobe-check test succeeds, MDA 203 can set the TestFlag parameter to 1 causing the system to remain in the tracking state and also set the TrackLock parameter to 1 to indicate to processor 204 that tracking is occurring. In contrast, if the mainlobe-check test fails, the TestFlag parameter can be set to 0 to cause the system to transition to the lost lock state. The TrackLock parameter can also be set to 0 to indicate that the object is no longer being tracked. When in the lost lock state, the system will return to open loop scanning as long as the ScanFlag parameter remains set. As part of this transition, processor 204 can set the ScanMode parameter to 0 to inform that system that the MDA tracking commands can be ignored.

The above described phase tracking is based on the premise that the phase transitions from positive to negative at the same location where the corresponding ratio is minimized. Hence, phase alignment to the phase response of the antenna comparator feed network is required for correct phase tracking. Based on this premise, by steering monopulse antenna 201 to these "phase zero crossings," MDA 203 will also be steering monopulse antenna 201 to the point where the difference between the sum channel power and the difference channel powers is maximized. However, there are situations where the phase zero crossings may not coincide with the ratio nulls making phase tracking less effective or even completely erroneous.

Figure 6A:
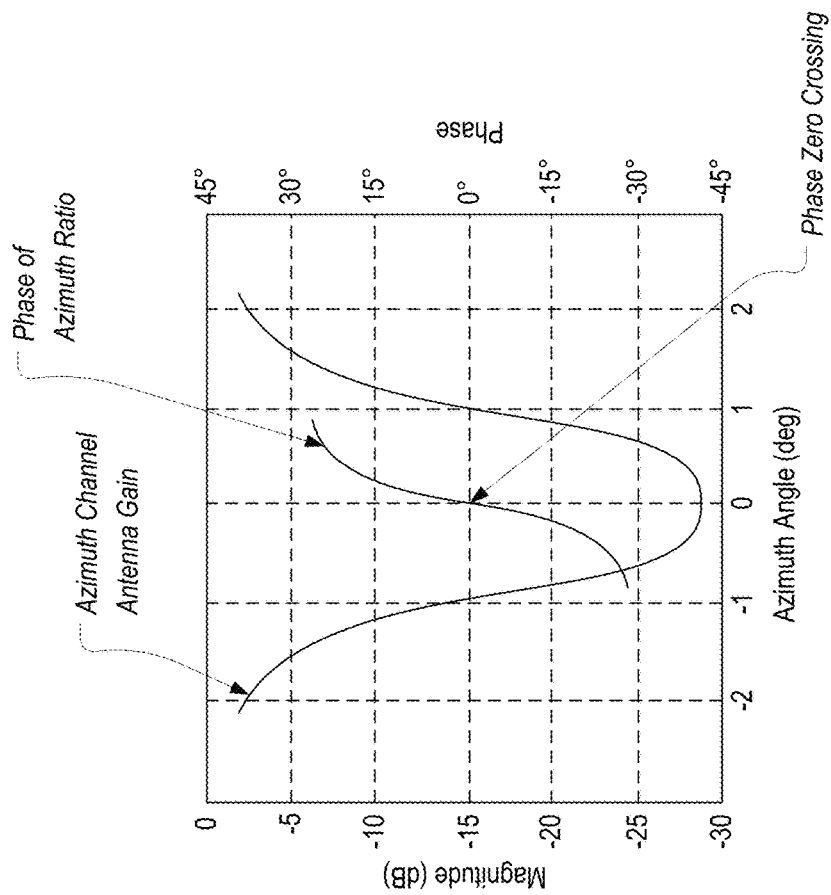
FIGS. 6A-6C provide various charts depicting how an antenna feed phase alignment error may exist.
Figure 6B:
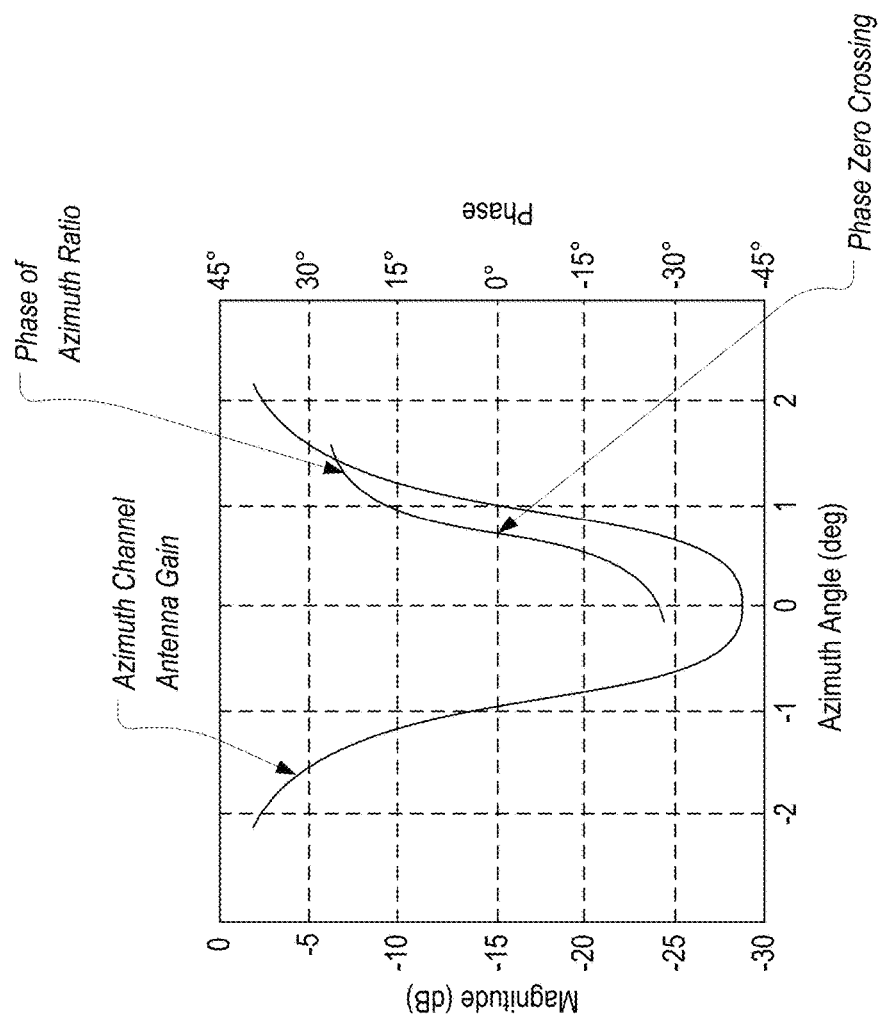

FIG. 6A provides a plot illustrating a case where the azimuth phase zero crossing coincides with the azimuth ratio null. In contrast, FIG. 6B provides a plot illustrating a case where the azimuth phase zero crossing is shifted to the right of the azimuth ratio null. Similar plots could be created for elevation but are not shown for sake of simplicity.

In these plots, the center horizontal line represents where the phase of the azimuth ratio transitions between positive and negative. The positive and negative values of the phase correspond directly to the sign of the azimuth or elevation ratio used to steer the antenna in phase tracking mode. In FIG. 6A, this phase zero crossing occurs at 0° azimuth which is also where the magnitude of the azimuth ratio is minimized. If it is assumed that the magnitude and phase of the elevation ratio similarly coincide, phase tracking would cause monopulse antenna 201 to be steered towards 0° azimuth and 0° elevation. In other words, the plot in FIG. 6A corresponds to what is shown in FIG. 5C.

In contrast, in FIG. 6B, the phase of the azimuth ratio is shifted to the right. Specifically, the phase zero crossing is shown as occurring at approximately 0.8° azimuth where the magnitude of the azimuth ratio is not minimized. In this scenario, phase tracking would cause monopulse antenna 201 to be steered away from the null in the azimuth ratio. More particularly, even if monopulse antenna 201 is initially oriented directly towards the azimuth null at 0°, the sign of the azimuth ratio will be negative indicating that the object is positioned to the left of the bore axis. If in phase mode, MDA 203 would steer monopulse antenna 201 to the left, away from the object. This leftward steering would continue until monopulse antenna 201 is offset by 0.8° to the left of the object. As shown in FIG. 6B, at this offset, the azimuth ratio is greatly increased which would negatively impact tracking. A similar result would happen if the phase of the elevation ratio is shifted from the elevation ratio null.

Figure 6C:
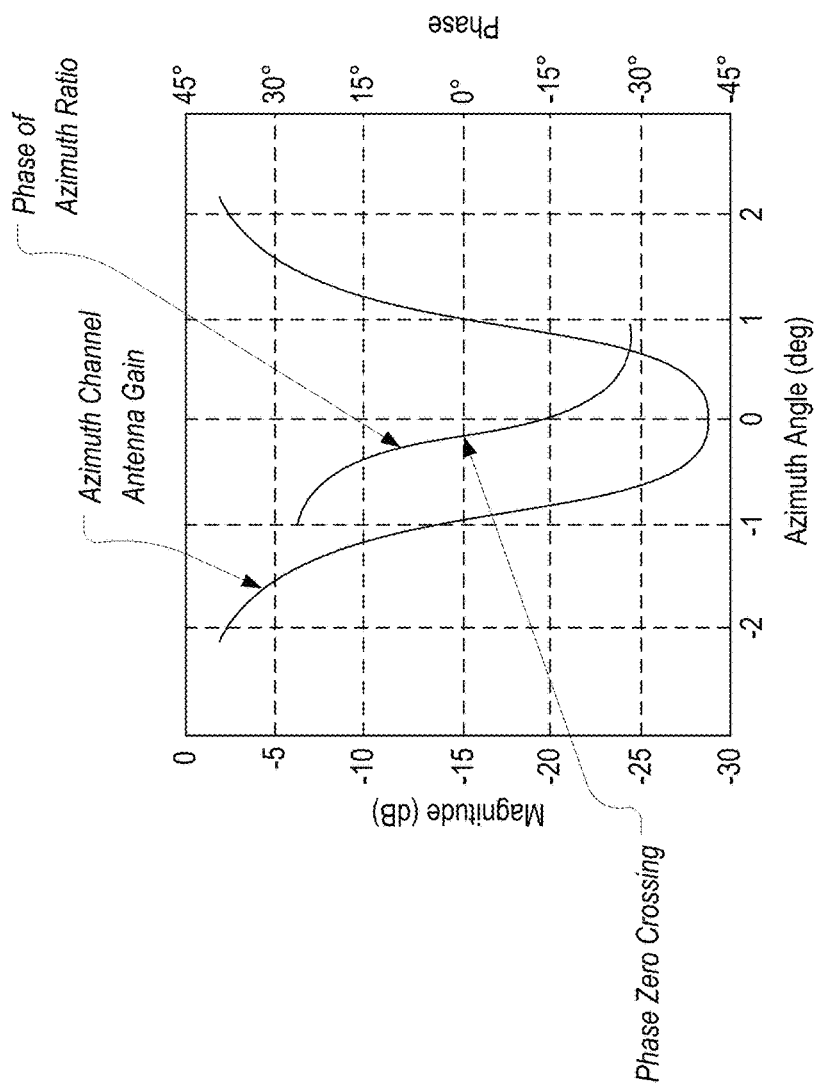

In a worst case scenario, the phase may be shifted so far that the phase is reversed at the corresponding ratio null. FIG. 6C illustrates this case for the azimuth ratio. As shown, the phase is positive to the left of the null and negative to the right of the null. Therefore, when phase tracking is employed, MDA 203 would steer monopulse antenna 201 away from the null and outside the mainlobe mistakenly believing that it is actually steering it towards the null. In essence, when the phase is shifted too much, the mainlobe will appear as a sidelobe during phase tracking thereby causing open loop scanning to be resumed even though the mainlobe had been located.

To correct for these phase shift scenarios, MDA 203 can be configured to perform "hybrid mode" tracking which employs a combination of both the magnitude-only tracking mode and the phase tracking mode of the azimuth and elevation ratios. In general, using phase mode for tracking is typically preferred to magnitude-only mode since it offers better accuracy, is faster, has increased bandwidth response, and greater pull-in range. Hybrid mode tracking allows phase to be used even when a misalignment in the phase is occurring.

As an overview, in hybrid mode tracking, MDA 203 can initially perform magnitude-only tracking to steer monopulse antenna 201 towards the azimuth and elevation nulls. During this magnitude-only tracking, MDA 203 can generate various thresholds that will later be employed during phase tracking to ensure that a phase misalignment does not cause monopulse antenna 201 to be steered substantially away from the nulls. Then, MDA 203 can perform phase tracking including performing various calculations to correct (or offset) a phase misalignment. If, during phase tracking, it is determined that monopulse antenna 201 has become substantially misaligned, magnitude-only tracking can be resumed until the nulls are again located. This process of switching between magnitude-only tracking and phase tracking can be repeated as necessary to ensure that phase tracking can be accurately performed even when a phase misalignment is occurring.

Prior to describing hybrid mode tracking in detail, it is to be understood that, during either magnitude-only or phase tracking, MDA 203 will constantly make slight adjustments to the boresight angle of monopulse antenna 201 (i.e., steer the antenna) in an effort to align the boresight angle with the target (which may be moving relative to the antenna). In magnitude-only tracking, MDA 203 will steer monopulse antenna 201 to attempt to minimize the azimuth and elevation ratios without using the phase response to determine the sign of the tracking error, whereas, in phase tracking, MDA 203 will steer monopulse antenna 201 to attempt to locate the phase zero crossings in the azimuth and elevation ratios. Accordingly, after each steering iteration, MDA 203 will generate current azimuth and elevation ratios and then calculate, from these current ratios, how to subsequently steer monopulse antenna 201.

Figure 7A:
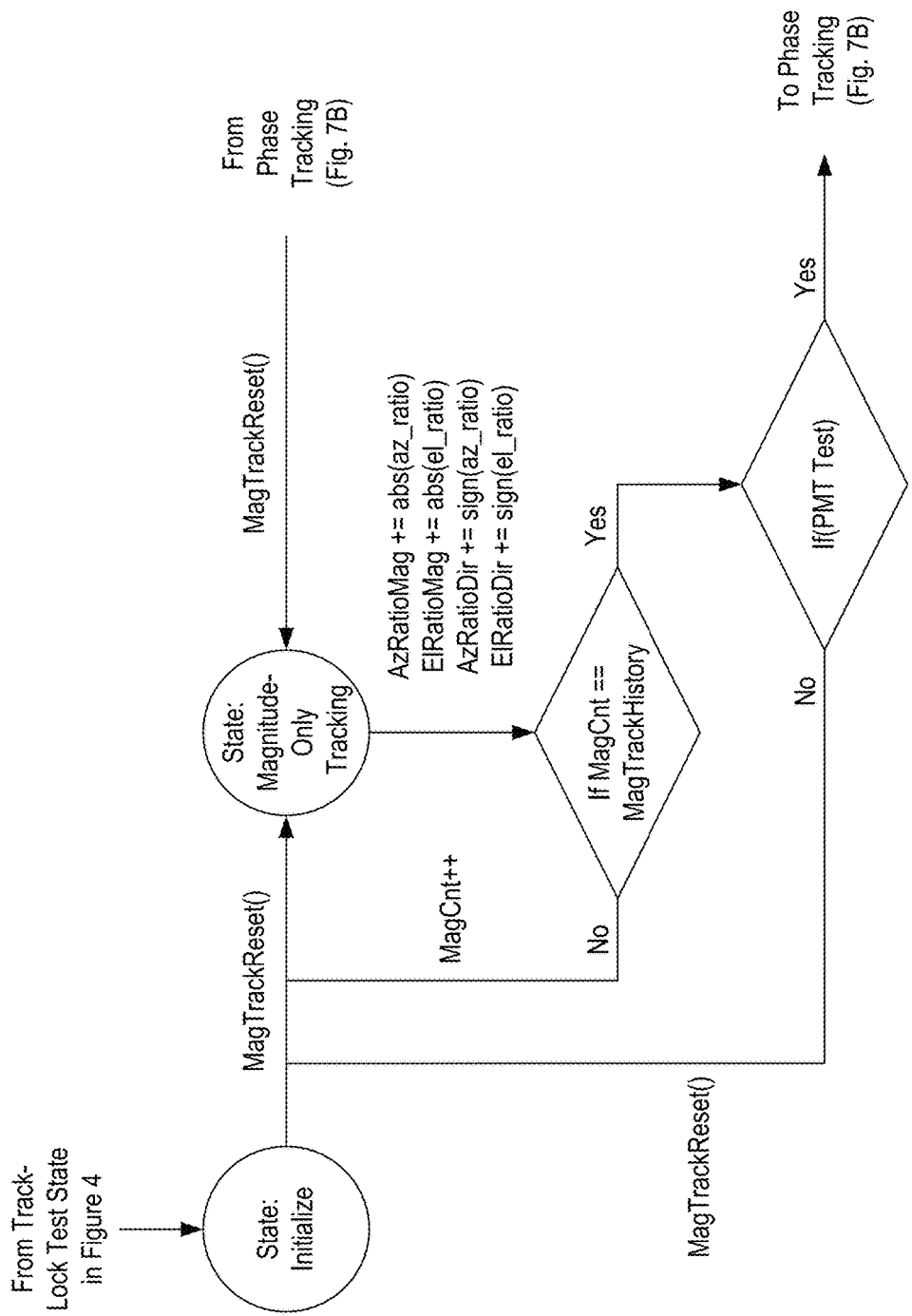
FIGS. 7A-7B illustrate a state diagram of a hybrid tracking process.
Figure 7B:
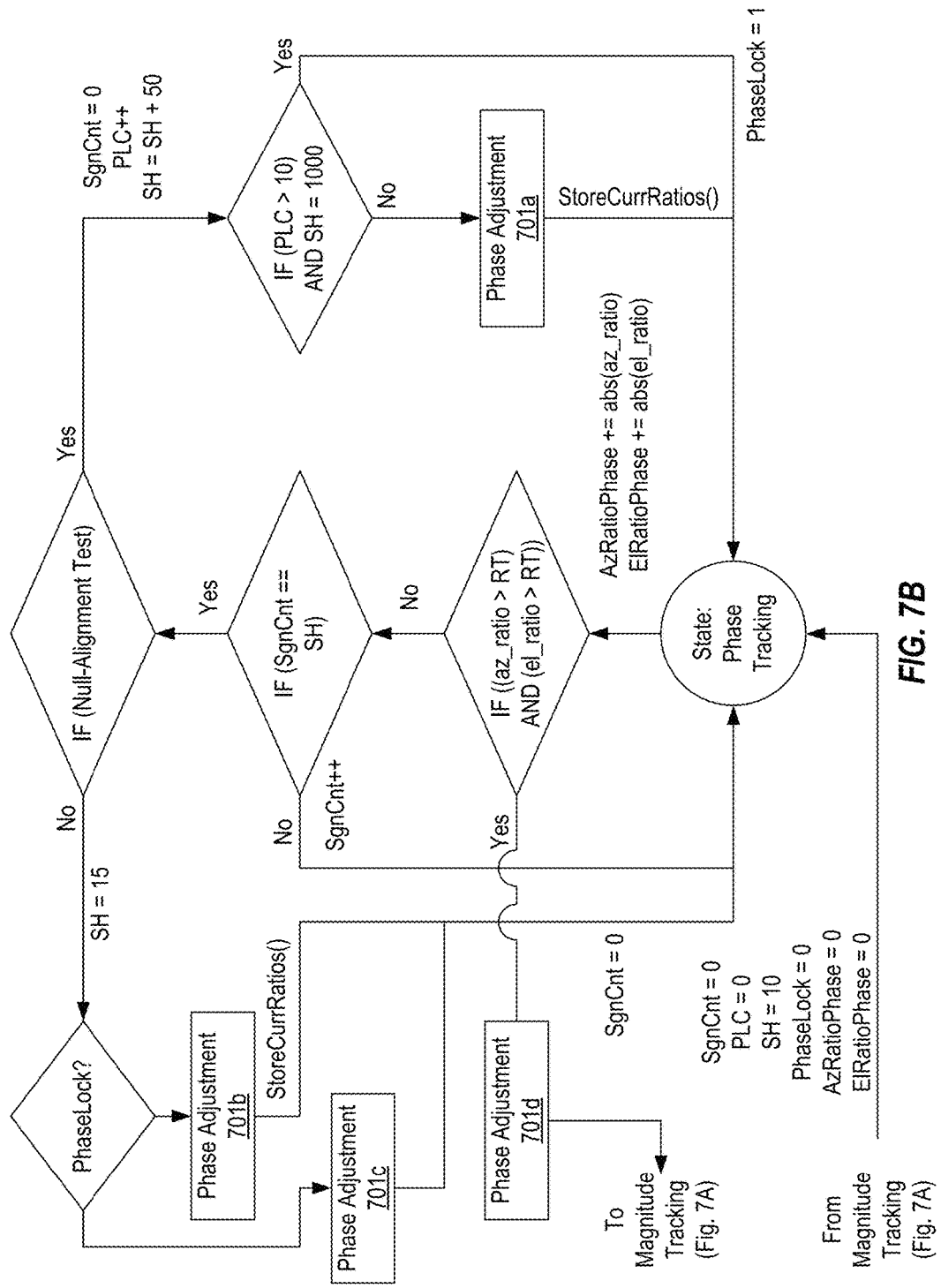

FIGS. 7A and 7B provide a state diagram for hybrid mode tracking in accordance with embodiments of the present invention. FIG. 7A illustrates the portion of the state diagram representing magnitude-only tracking, while FIG. 7B illustrates the portion of the state diagram representing phase tracking. This state diagram can represent the process that is performed in the Tracking state shown in FIG. 4. As indicated above, in hybrid mode tracking, magnitude-only tracking can be performed to initially locate the nulls and then phase tracking can perform phase correction if needed.

Turning to FIG. 4, when the track-lock test passes, MDA 203 will commence tracking in the tracking state. When hybrid-mode tracking is enabled, as shown in FIG. 7A, this can include transitioning from the track-lock test state to an initialize state in which a number of tracking parameters are initialized (as represented by MagTrackReset( )). These tracking parameters include a MagCnt parameter which tracks the number of magnitude tracking iterations that have been performed, an AzRatioMag parameter which stores a value representing the sum of the absolute value of the magnitudes of the azimuth ratio within the MagCnt period, an ElRatioMag parameter which stores a corresponding elevation value representing the sum of the absolute value of the magnitudes of the elevation ratios within the MagCnt period, an AzRatioDir parameter which stores a value representing a sum of the signs of the azimuth ratio, and an ElRatioDir parameter which stores a value representing a sum of the signs of the elevation ratio. Each of these parameters can be initialized to zero (e.g., by calling MagTrackReset( )) as part of transitioning into the magnitude-only tracking state.

As mentioned above, magnitude-only tracking entails calculating the magnitude of current values of the azimuth ratio (az_ratio) and the elevation ratio (el_ratio) and then steering monopulse antenna 201 to minimize the ratio. At each iteration of this steering (i.e., each time MDA 203 causes the boresight angle of monopulse antenna 201 to be changed), the absolute values of the azimuth and elevation ratios can be added to the AzRatioMag and ElRatioMag parameters respectively. Therefore, at any given time, each of these two parameters will store a sum of the magnitudes of the corresponding ratios that have been calculated during the previous iterations of magnitude tracking. The purpose of this summation is to eventually compute an average ratio magnitude value that can be used for future comparison. Also, at each iteration of this steering, the AzRatioDir and ElRatioDir parameters can be updated by adding 1 or −1 to the value of the parameter based on the sign of the current azimuth or elevation ratio respectively. In particular, when the corresponding ratio has a positive value (e.g. when the target is to the right of or above the boresight angle), the parameter can be incremented by 1, whereas when the corresponding ratio has a negative value (e.g., when the target is to the left of or below the boresight angle), the parameter can be decremented by 1. In theory, for a perfect tracking system, the result of this calculation when tracking perfectly at the null would average out to 0. At each iteration, a value of the MagCnt parameter can also be incremented by 1.

This loop can be repeated until a specified number of iterations have been performed. For example, the MagTrackHistory parameter can be set to a desired value (e.g., 250). Then, once the MagCnt parameter reaches the value of the MagTrackHistory parameter, the phase mode transition (PMT) test can be performed to determine whether the process should transition into phase tracking. Assuming the value of the MagTrackHistory parameter is 250, 250 iterations of magnitude tracking will be performed prior to performing the PMT test. In this case, both the AzRatioMag and ElRatioMag parameters would equal the sum of the magnitudes of the 250 previous azimuth and elevation ratios, respectively. At this point, they will each be divided by MagCnt to obtain the average ratio value for the azimuth and elevation channels. These parameters can be employed later during phase tracking as will be described below.

The PMT test can be employed to determine whether monopulse antenna 201 has been steered sufficiently towards the azimuth and elevation nulls. For example, in some embodiments, the PMT test can determine whether the absolute values of both the AzRatioDir and ElRatioDir parameters are below a defined threshold (e.g., IF ((Abs(AzRatioDir)<Threshold) and (Abs(ElRatioDir)<Threshold)). For example, when the MagTrackHistory parameter is set to 250, the Threshold used in the PMT test can be 125. This Threshold can be a configurable parameter to allow monopulse antenna system 200 to be configured for a specific environment or for a specific target. For example, faster moving targets may require a larger threshold.

If the null has been found, MDA 203 would typically cause monopulse antenna 201 to dither about this null such that the sign of the azimuth and elevation ratios (using the magnitude-only mode tracking definition of a sign-change) will periodically switch back and forth. Therefore, when the null has been found, the values of the AzRatioDir and ElRatioDir should be minimized and the PMT test will pass causing phase tracking to be commenced. In contrast, if the PMT test fails, the process can be repeated by resetting the values of each of the parameters (e.g., by calling MagTrackReset( ) to set MagCnt, AzRatioMag, ElRatioMag, AzRatioDir, and ElRatioDir equal to 0) and returning to the magnitude tracking state as shown in FIG. 7A.

As an example of magnitude-only tracking, if the target is initially to the right of the boresight angle, the azimuth ratio will have a magnitude value of Y. In this scenario, and having known the previous direction, MDA 203 will steer monopulse antenna 201 slightly to the right, reducing the azimuth ratio eventually to a magnitude of Z, which represents the minimum azimuth ratio magnitude achieved by the azimuth difference channel null. This process will be repeated until the azimuth ratio magnitude becomes greater than Z (i.e., once the target is to the left of the boresight angle). Therefore, as monopulse antenna 201 is steered towards the null, the value of AzRatioDir will be positive for a number of iterations. If the azimuth ratio is positive for 250 consecutive iterations (meaning that the null has yet to be reached), the value of the AzRatioDir parameter will be 250 therefore causing the PMT test to fail and magnitude tracking to be continued for 250 more iterations. In contrast, if the azimuth ratio is positive for 100 consecutive iterations (which would result in the AzRatioDir parameter reaching a value of 100) and then commences switching back and forth between increasingly larger magnitudes, the AzRatioDir would remain close to 100 (or less) such that the PMT test would pass. In this way, the AzRatioDir and ElRatioDir parameters can be used to determine when the nulls have been found during magnitude-only mode and therefore that phase tracking can be commenced.

Turning now to FIG. 7B, upon transitioning to phase tracking, a number of parameters can be initialized for use in the phase tracking process. These parameters include a SgnCnt parameter which tracks the number of phase tracking iterations that have been performed, a phase lock counter (PLC) parameter that is used to determine when phase lock has occurred, a sign history (SH) parameter which is used to define how many iterations of phase tracking will be performed before a phase error calculation will be performed, a PhaseLock parameter which defines whether phase lock has occurred, an AzRatioPhase parameter which stores a value representing the sum of the absolute value of the magnitudes of the azimuth ratios within a SgnCnt period, and an ElRatioPhase parameter which stores a value representing the sum of the absolute value of the magnitudes of the elevation ratios within a SgnCnt period. In this example, it is assumed that the SH parameter is initially set to 10 while the other parameters are initially reset to 0.

As compared to the magnitude-only tracking method described above, during traditional phase tracking, MDA 203 will steer monopulse antenna 201 based on the current phases (or signs) of the azimuth and elevation ratios. Assuming there is no phase error, the phase response of the difference channel signals should be zero at the nulls, and therefore, MDA 203 will steer monopulse antenna 201 to attempt to remain near these phase zero crossings. This can be accomplished by steering the monopulse antenna by an azimuth step and an elevation step at each iteration. The direction of each step will be based on the sign of the corresponding azimuth and elevation tracking ratios. Therefore, MDA 203 will cause monopulse antenna 201 to dither about the phase zero crossings (i.e., it would repeatedly steer the antenna in stepped increments in one direction until the sign changes and then return in stepped increments in the opposite direction). However, if there is a phase error, the phase zero crossings will not align with the nulls which would result in this dithering occurring away from the nulls, or, if the phase error is significant, in the eventual failure of the mainlobe-check test and the return to open loop scanning.

To account for these phase error scenarios, the phase error correction process depicted in FIG. 7B can be implemented. Prior to describing the phase error correction process, it is to be understood that the phase error that is to be corrected exists in the signal received at the individual antenna elements as opposed to phase drift that may occur on each individual channel as the received signals are processed within monopulse antenna system 200, or even the sum-to-difference channel phase alignment to compute the difference channel ratio. The phase drift that can occur on each individual channel may be due to different phase errors that are introduced on a component-by-component basis during the independent processing of the channels (e.g., an LNA used to produce the sum channel may introduce a different phase error than an LNA used to produce the azimuth difference channel). Such phase drift is also exacerbated over frequency and temperature. This phase error can be overcome by some amount of hardware unit calibration and is not discussed in this patent. Furthermore, phase alignment is essential to computing azimuth and elevation tracking ratios. The crucial phase alignment in this case is the sum channel signal phase relative to the difference channel signal phase. Techniques exist for accounting for this type of phase alignment when digitally combining the sum and difference channels (see e.g., U.S. patent application Ser. No. 14/572,470) but such techniques are not the subject of the present invention. However, the phase error correction process of the present invention can be used in conjunction with such phase drift calibration or sum-to-difference channel phase alignment/correction techniques. In short, the present invention can allow phase tracking to be employed even when the signals received at the individual antenna elements are not phase aligned with the down-stream RF and digital processing.

Figure 8:
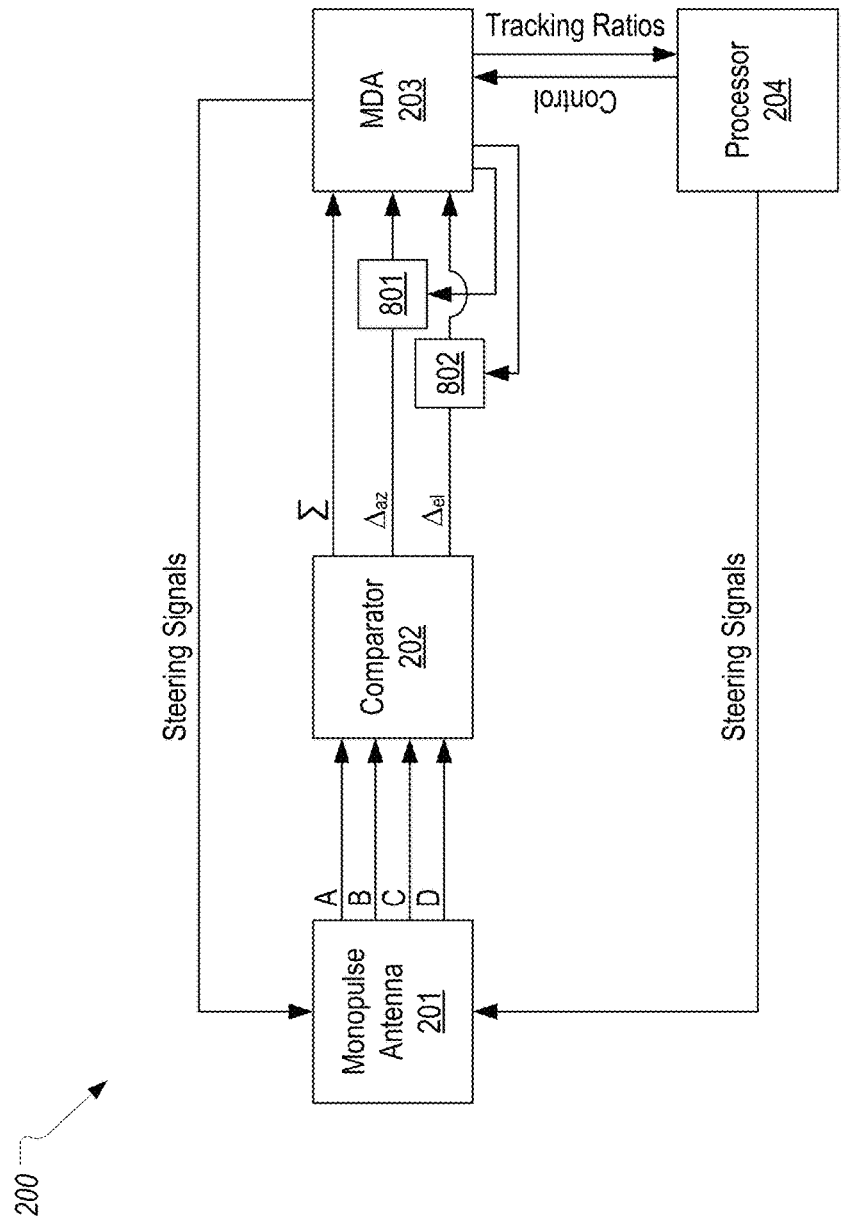
FIG. 8 illustrates a block diagram of a monopulse antenna system that is configured to implement the hybrid tracking process in accordance with one or more embodiments of the present invention.

To enable phase errors to be corrected, monopulse antenna system 200 can include a phase shifter 801 and 802 in the azimuth difference channel and elevation difference channel respectively as shown in FIG. 8. Phase shifters 801 and 802 can preferably be implemented on an FPGA that forms part of MDA 203. Therefore, even though for illustrative purposes FIG. 8 depicts phase shifters 801 and 802 as separate from MDA 203 (which is one possible way in which the phase shifters 801 and 802 could be implemented), for speed and efficiency reasons, FPGA-implemented phase shifters may typically be employed. The process depicted in FIG. 7B will calculate a phase shift that should be applied by each of phase shifters 801, 802 to account for a phase error. MDA 203 can calculate the required phase shift in a systematic method until the current phase shift corrects for all measured phase error. MDA 203 can perform this process independently for each difference channel as will now be described in detail.

As shown in FIG. 7B, after the conditions of the PMT test are met, MDA 203 will transition into phase tracking. As part of this transition, the SH parameter can be set to an initial value (e.g., 10) while the PLC, PhaseLock, AzRatioPhase, and ElRatioPhase parameters can be set to 0. As indicated above, during phase tracking, MDA 203 will steer monopulse antenna 201 in azimuth and elevation steps based on the phase (or sign) of the current azimuth and elevation ratios. Initially, it can be assumed that no phase error exists (i.e., that the phase zero crossings align with the nulls in the ratios) and therefore that phase shifters 801, 802 are configured to apply no phase shift (i.e., a 0° shift) to the corresponding difference channel.

As shown, at each iteration of phase tracking, MDA 203 can add the absolute value of the azimuth and elevation ratios to the AzRatioPhase and ElRatioPhase parameters respectively. Also, at each iteration, MDA 203 will compare the current magnitude of the azimuth and elevation ratios to a Radius Threshold (RT) parameter. The RT parameter can be a configurable parameter that controls when MDA 203 will return to magnitude-only tracking. For example, RT can be set to 0.25 (assuming the ratios during magnitude-only tracking were lower than this amount) such that, whenever either the azimuth or elevation ratio exceeds 0.25 (which would indicate that monopulse antenna 201 is at potential risk for failing the mainlobe-check test), MDA 203 will resume magnitude-only tracking to return to tracking near the difference channel nulls.

As long as the azimuth and elevation ratios remain below RT, MDA 203 will continue to sum the magnitudes of the ratios until SgnCnt (which is incremented with each iteration) equals SH. As mentioned above, SH can initially be set to 10 such that 10 iterations will initially be performed. After these 10 iterations, the null-alignment test (NAT) will be evaluated based on the average values of the AzRatioPhase and ElRatioPhase parameters (based on SgnCnt iterations) and the stored values of the AzRatioMag and ElRatioMag parameters. In other words, MDA 203 can compare the magnitudes of the ratios during phase tracking to the magnitudes of the ratios during the previous magnitude tracking to determine whether the current magnitudes have increased beyond a threshold.

For example, the NAT can be: IF AzRatioPhase/SH<(AzRatioMag/MTH) and IF ElRatioPhase/SH<(ElRatioMag/MTH). The NAT can therefore determine whether the average magnitude of the ratios during SH iterations of phase tracking is less than the average magnitude of the ratios during the MTH iterations of magnitude tracking that were performed prior to commencing phase tracking. In some embodiments, the average magnitude of the magnitude-only mode ratios can be scaled by a factor of X (e.g., IF AzRatioPhase/SH<(AzRatioMag/MTH)*X and IF ElRatioPhase/SH<(ElRatioMag/MTH)*X. As an example, X can be set to 1.25. The primary purpose of the NAT is to determine whether phase tracking has kept monopulse antenna 201 oriented towards the nulls. Since the average ratios from magnitude-only tracking should represent the average ratios at the nulls, the NAT will identify whether phase tracking caused monopulse antenna 201 to be steered away from the nulls. Scaling by X can prevent the NAT from failing when there are only slight differences between the average magnitude and phase ratios.

If the NAT passes, it is assumed that monopulse antenna 201 is still near the nulls and a determination of whether a phase lock has already been established can be performed. In contrast, if the NAT fails, it is assumed that monopulse antenna 201 has been steered away from the null(s) due to the phase zero crossing(s) not aligning with the null(s). If the NAT fails, a phase correction can be calculated and applied to the appropriate difference channels. It is noted that a phase error may exist only in one ratio. Therefore, MDA 203 can perform the phase error correction process independently on each ratio. In particular, the NAT may be performed independently on each ratio leading to an independent calculation of a phase correction for each difference channel. However, for ease of illustration, it will be assumed that a similar phase error exists in both difference channels such that the phase error correction process will proceed in sync for both ratios.

Assuming the NAT passes for both ratios, MDA 203 will proceed to determine whether a phase lock has been established. Each time the NAT passes, PLC can be incremented by 1 and SH can be incremented by 50 (or some other reasonable value) unless SH has already reached 1000 (or some other reasonable value) in which case SH will remain at 1000. Then, a phase lock determination can be made. In this case, if PLC is greater than 10 and SH equals 1000, it can be determined that phase lock has occurred. Therefore, for phase lock to occur, the average magnitudes of the ratios must remain below the average magnitudes (or scaled average magnitudes) of the ratios that existed during magnitude-only tracking for a large number of iterations. This would be the case if phase tracking is keeping monopulse antenna 201 at the nulls. If phase lock has occurred, the PhaseLock parameter can be set to 1 and phase tracking can be continued without any adjustment to the current phase corrections (i.e., without updating phase shifters 801, 802).

In contrast, if phase lock has not yet occurred, updated phase corrections can be calculated at phase adjustment block 701a. The specific manner in which an updated phase correction can be calculated will be described below. Because the NAT has passed thereby implying that monopulse 201 is still at or near the nulls, a relatively small adjustment can be made to the phase corrections. In other words, it can be assumed that the current phase corrections are substantially offsetting any phase error that may exist but that it may be possible to improve the phase corrections. MDA 203 can therefore continue to make these slight phase adjustments in an attempt to completely offset any measurable phase error.

Also, the direction of this phase adjustment can be based on whether the magnitude of the corresponding ratio is increasing or decreasing. In other words, if the magnitude of AzRatioPhase (using azimuth as an example) computed at the SH interval is larger than the AzRatioPhase during the previous SH period, it can be assumed that the current phase correction does not perfectly align the phase zero crossing with the null and therefore the phase correction should be adjusted in a negative direction (i.e., leftward or downward with respect to the example orientation used above). In practice, phase adjustment block 701a will make repeated small adjustments to the phase correction in one direction until the phase correction causes the phase zero crossing to be positioned on the opposite side of the null (from the perspective of MDA 203). At this point, phase adjustment block 701a will make repeated adjustments in the other direction. Assuming monopulse antenna 201 remains in the nulls, this process will continue until phase lock is established.

Whenever the NAT fails, the process will flow to either phase adjustment block 701b if phase lock has been established (i.e., if the PhaseLock parameter is set to 1) or to phase adjustment block 701c if phase lock has not been established. In each of phase adjustment blocks 701b, 701c, updated phase corrections can be calculated. With regards to phase adjustment block 701b, because phase lock had been established, the adjustment to the phase correction can be small but slightly greater than the adjustment made in phase adjustment block 701a, whereas, with regard to phase adjustment block 701c, because phase lock has not been established, a relatively large adjustment can be made. Again, these adjustments to the phase corrections can be made to attempt to more accurately offset the actual phase error. The primary role of the phase error correction process therefore is to repeatedly increment the phase corrections until the measurable phase error is minimized. Whenever the NAT fails, SH can be set to 15 (or some other reasonable value) and SgnCnt can be reset to cause 15 iterations to be performed prior to again evaluating the NAT.

Finally, if either of the ratios exceeds RT, MDA 203 can transition back to magnitude-only tracking including calculating new phase corrections at phase adjustment block 701d. In this case, it can be assumed that the current phase corrections are not accurate and should be substantially updated. Therefore, phase adjustment block 701d can apply a large (e.g., 90°) adjustment to the phase corrections prior to resuming magnitude tracking. The adjustments made by phase adjustment block 701d will remain during magnitude-only tracking and until a subsequent adjustment is made once phase tracking is again resumed. Once phase tracking is resumed, the same process will be performed to again locate a phase correction that will offset the phase error.

Figure 9A:
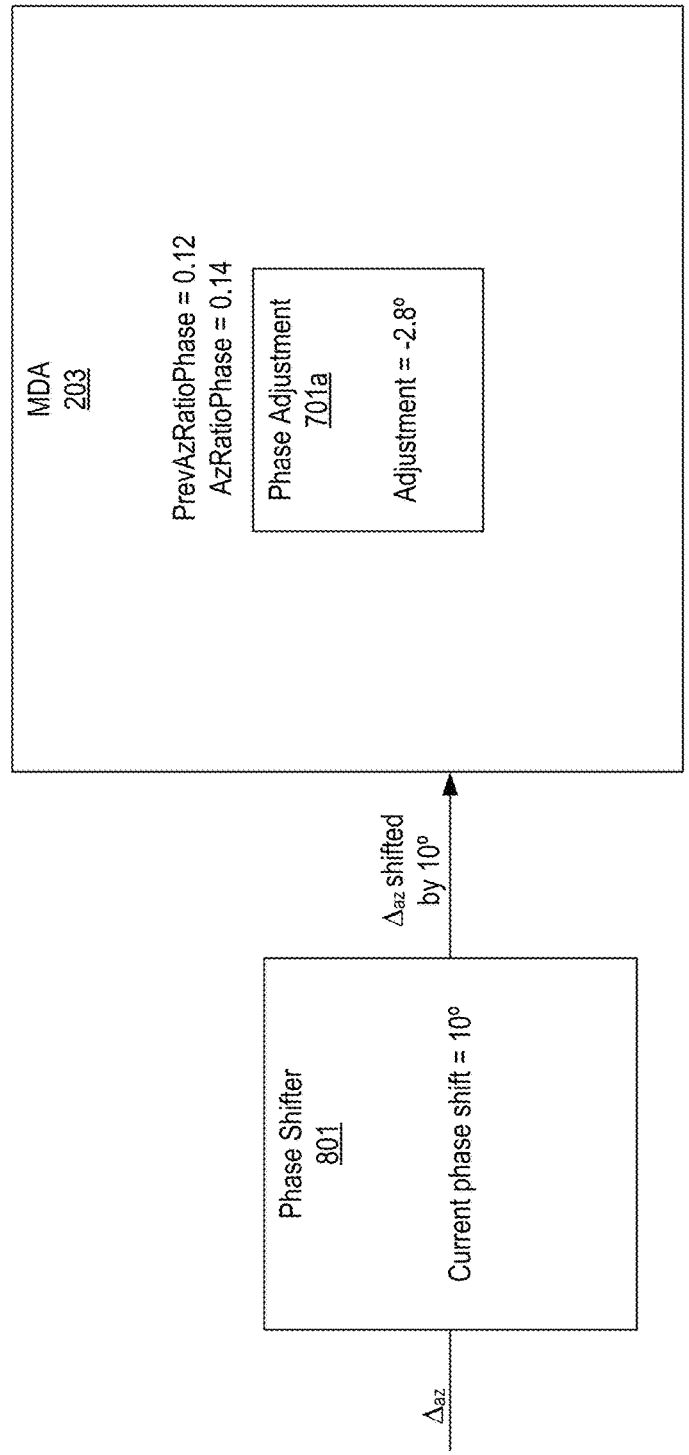
FIGS. 9A and 9B illustrate an example of how a phase shifter can be updated to apply a different phase correction during the hybrid tracking process.
Figure 9B:
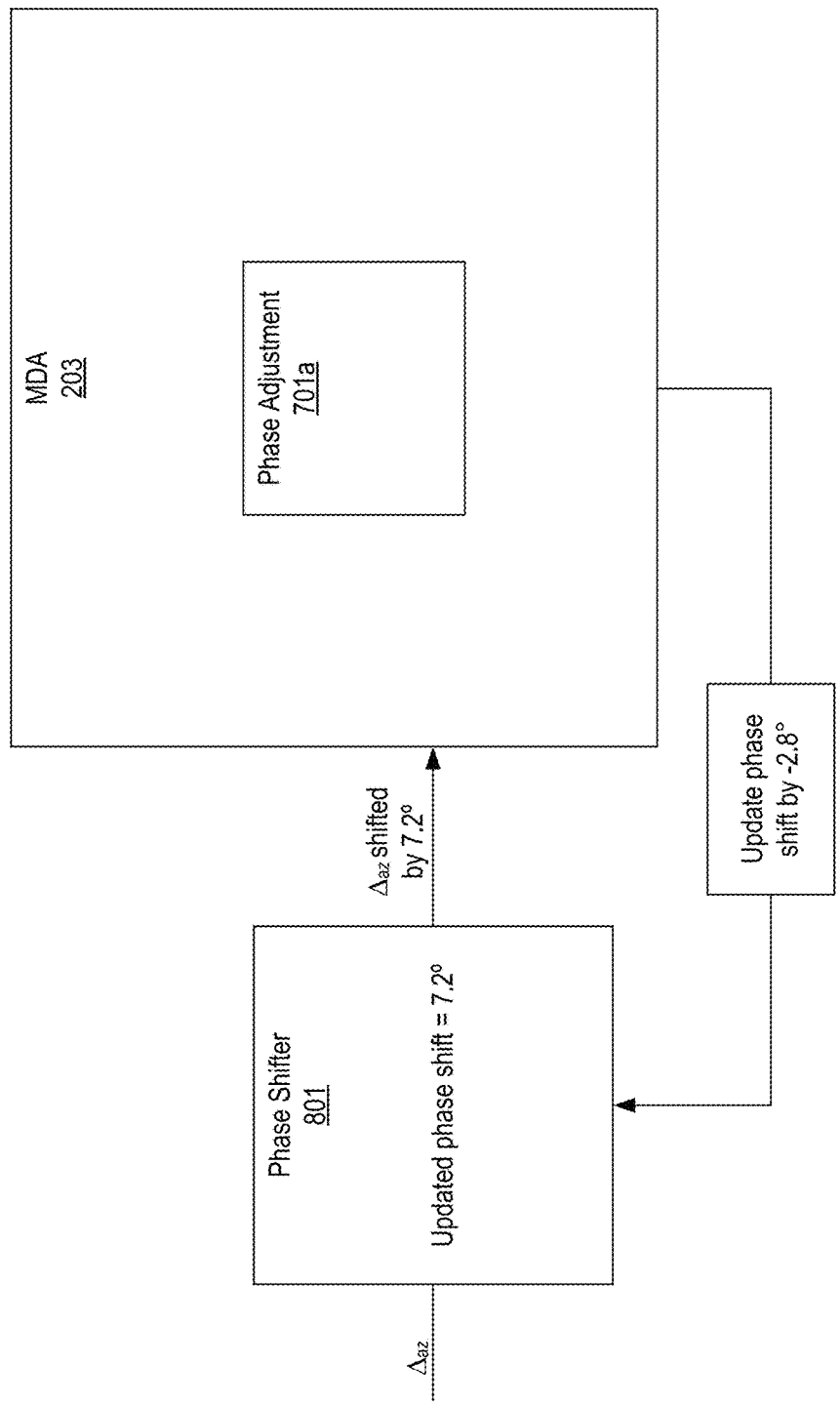

If the phase error correction process reaches phase adjustment blocks 701a or 701b, it can be assumed that the current phase corrections are relatively accurate. Therefore, phase adjustment blocks 701a, 701b can be configured to make small adjustments to the phase corrections. FIGS. 9A and 9B generally illustrate how this can be done for the azimuth difference channel. In FIG. 9A, it is assumed that phase shifter 801 is currently configured to apply a phase shift of 10° to the azimuth difference channel. While this 10° phase shift is being applied, MDA 203 can perform the phase error correction process including calculating the magnitude of the azimuth ratio at each steering iteration. As represented by StoreCurrRatios( ) in FIG. 7B, MDA 203 can be configured to retain the values of the previous AzRatioPhase and ElRatioPhase computed during the previous SH loop period (e.g., as values of PrevAzRatioPhase and PrevElRatioPhase parameters) to allow MDA 203 to determine whether the ratios are increasing or decreasing in subsequent periods. In other words, the phase corrections calculated in phase adjustments blocks 701a and 701b are based on a comparison of the current ratio average to the corresponding previous ratio average. In this example, it will be assumed that the current AzRatioPhase (computed after reaching SH SgnCnt iterations) averages to a magnitude of 0.14, but the prevAzRatioPhase magnitude during the previous SH period had an average of 0.12, thereby indicating that monopulse antenna 201 is currently being steered away from the azimuth null. Therefore, the computed phase adjustment block 701a can determine that the phase correction being applied by phase shifter 801 should be reduced.

Assuming that phase adjustment block 701a is configured to make approximately a 2.8° adjustment (represented by 8 steps of a 10-bit digital phase-shifter), MDA 203 can apply this adjustment as −2.8° to the current phase shift (i.e., 8 steps or $$\left(\frac{\pi}{64}\right) * \text{NewDirection,}$$

where NewDirection is + when the ratio is decreasing and − when the ratio is increasing). Accordingly, FIG. 9B shows the result of the example described in FIG. 9A, where MDA 203 outputs a signal to phase shifter 801 causing phase shifter 801 to apply a phase shift of 7.2°. A similar calculation, but with a different phase step size will be performed by phase adjustment block 701b. For example, phase adjustment block 701b could be configured to apply an 11.25° adjustment to the current phase correction where this adjustment will be added to or subtracted from the current phase correction depending on whether the azimuth ratio is decreasing or increasing respectively (i.e., 32 steps or $$\left(\frac{\pi}{16}\right) * \text{NewDirection).}$$

This calculation of the adjustment to the phase correction can be performed independently for each of the azimuth and elevation ratios so that a proper adjustment can be supplied to each of phase shifters 801, 802. In short, phase adjustment blocks 701a, 701b can both be configured to apply a fixed adjustment to the current phase shift in a direction that is dependent on whether the corresponding ratio is increasing or decreasing.

Phase adjustment blocks 701c, 701d can be configured to calculate an adjustment in a slightly different manner. Rather than employing previous ratio magnitude averages to determine whether a ratio is increasing or decreasing, each of phase adjustment blocks 701c, 701d can employ the sin( ) of the current ratio to determine the direction of the adjustment as well as to scale the amount of the adjustment. For example, phase adjustment block 701c can calculate the adjustment as 64 steps of a 10-bit digital phase shifter $$\left(\frac{\pi}{8}\right) * \sin(\text{ratio})$$

and phase adjustment block 701*d* can calculate the adjustment as 256 steps of a 10-bit phase shifter $$\left(\frac{\pi}{2}\right) * \sin(\text{ratio}).$$

In summary, phase adjustment blocks 701*a*-701*c* can each be configured to calculate an adjustment to the phase corrections that are currently being applied by phase shifters 801, 802 in an attempt to offset any phase error that may exist during subsequent phase tracking. In contrast, phase adjustment block 701*d* can apply a large adjustment to the phase corrections prior to transitioning back to magnitude tracking since these current phase corrections will have caused phase tracking to incorrectly steer monopulse antenna 201 away from the nulls.

When a phase error exists, phase tracking will initially steer monopulse antenna 201 away from the null. As this steering is occurring, MDA 203 will detect that the ratios are increasing when the NAT fails and can then adjust the phase correction being applied by phase shifter 801 and/or 802. These repeated adjustments to the phase correction should ultimately offset the phase error thereby aligning the phase zero crossings with the nulls. Once this alignment occurs, phase lock will be established and the NAT will be applied on a less frequent interval. Absent any significant change to the phase error, this phase lock will be retained thereby allowing MDA 203 to perform phase tracking throughout the tracking process. In other words, once phase lock is obtained, no more phase corrections are required unless there is some tracking event that causes the tracking to revert back to magnitude-only tracking mode.

As mentioned above, MDA 203 can be configured to track in magnitude-only mode in which the tracking is performed independent of the phase of the ratios. MDA 203 could be configured to track in magnitude-only mode or in hybrid mode as described above. To illustrate how magnitude-only tracking can be performed when in hybrid mode, the following description will highlight implementations where MDA 203 is in hybrid mode. It is to be understood, however, that MDA 203 could be configured to perform the following magnitude-only tracking techniques even when no phase mode tracking is performed.

As an overview, when in magnitude-only mode, MDA 203 will generate steering signals that are based on the absolute value of the magnitude of the azimuth and elevation ratios, or more particularly, based on whether the absolute value of these ratios is increasing or decreasing. This is based on the assumption that these ratios will be minimized when the boresight angle of monopulse antenna 201 is aligned with the tracked object. To simplify the following description, the terms "azimuth ratio" and "elevation ratio" (or simply ratios) may be used in place of the terms "magnitude of the azimuth ratio" or "magnitude of the elevation ratio." It should be understood, however, that the magnitudes of these ratios are employed in the magnitude-only tracking mode.

Because magnitude-only tracking is based on whether the absolute values of the azimuth and elevation ratios are increasing or decreasing, MDA 203 can be configured to store previous values of the azimuth and elevation ratios to allow these previous values to be compared to the current values of the ratios. If the magnitude of the ratio is decreasing, MDA 203 can continue to steer monopulse antenna 201 in the same direction. On the other hand, if the ratio is increasing, MDA 203 can start to steer monopulse antenna 201 in the opposite direction. As mentioned above, this process may typically result in monopulse antenna 201 dithering about the nulls in the ratios which will oftentimes occur when monopulse antenna 201 is pointed directly at the object to be tracked.

One problem that arises in magnitude-only tracking is that MDA 203 may calculate steering signals at a faster rate than monopulse antenna 201 can respond to the steering signals. For example, if MDA 203 is configured to generate ratios at a rate of one per 4 milliseconds, the steering signals could in theory be changed every 4 milliseconds. In practice, however, it is more likely that a number of iterations will be performed before the antenna can respond to the steering signals. Thus, due to the inertial mass of the antenna, there is a limit to how quickly the direction of monopulse antenna 201 can be reversed. For example, if monopulse antenna 201 is being steered in an upward direction and MDA 203 determines that the elevation ratio is increasing, MDA 203 would update the elevation steering signal to cause monopulse antenna 201 to be steered in a downward direction. In response, the motors of monopulse antenna 201 would attempt to stop the upward movement and commence downward movement of the antenna. Due to the upward inertia, this reversing of the direction of monopulse antenna 201 would span a period of time. If during this period, the elevation ratio continued to increase (which it likely would given that the antenna will continue to move upwardly for a short period of time after the steering signals are updated), MDA 203 may determine that the direction of monopulse antenna 201 should again be reversed and may update the steering signals to cause monopulse antenna 201 to be steered in an upward direction. In such a scenario, MDA 203 may cause monopulse antenna 201 to rapidly pivot back and forth without moving towards the null.

To address this and other issues, embodiments of the present invention employ a technique where "ratio bins" are defined to control when a change in direction will occur. Additionally, MDA 203 can define a "hold period" during which a change in direction will not occur even if the corresponding ratio is determined to be increasing.

Figure 10:
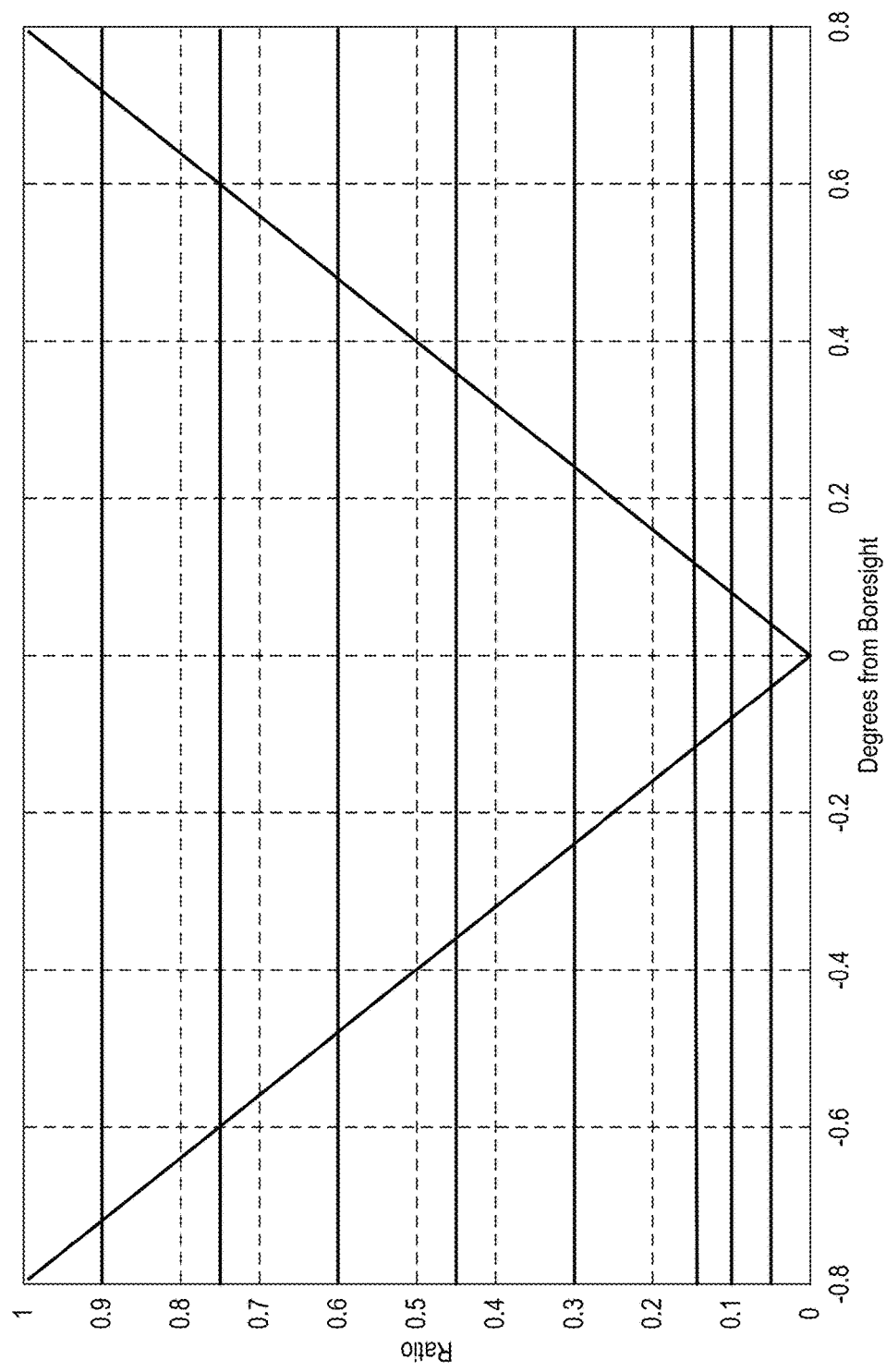
FIG. 10 illustrates an example of how ratio bins can be defined for use in magnitude-only tracking to minimize the frequency of changes in the steering direction of a monopulse antenna.

FIG. 10 illustrates an example of how ratio bins can be defined. The graph in FIG. 10 depicts the magnitude of a ratio (which may be either the elevation or the azimuth ratio) with respect to a tracked object's distance (in degrees) from the corresponding boresight. For example, when the boresight of monopulse antenna 201 is aligned with the object, the ratio is assumed to be 0, whereas when the boresight of monopulse antenna 201 is oriented 0.4 degrees from the object, the ratio is assumed to be 0.5. These values are used as examples only and the actual ratio magnitude at any particular orientation would vary based on a number of factors.

The graph of FIG. 10 also includes a number of horizontal lines that delineate various ratio bins. For illustrative purposes, the bottommost bin (which ranges from 0 to 0.05) will be referred to as bin 1, the next bin (which ranges from 0.05 to 0.1) will be referred to as bin 2, the next bin (which ranges from 0.1 to 0.15) will be referred to as bin 3, and so on. In some embodiments, the "width" of the bins may be narrower at smaller ratio magnitudes than at larger ratio magnitudes. By way of overview, MDA 203 can employ these bins to determine when to change the direction of monopulse antenna 201 rather than basing this determination only on whether the ratio is increasing or decreasing.

Figure 11:
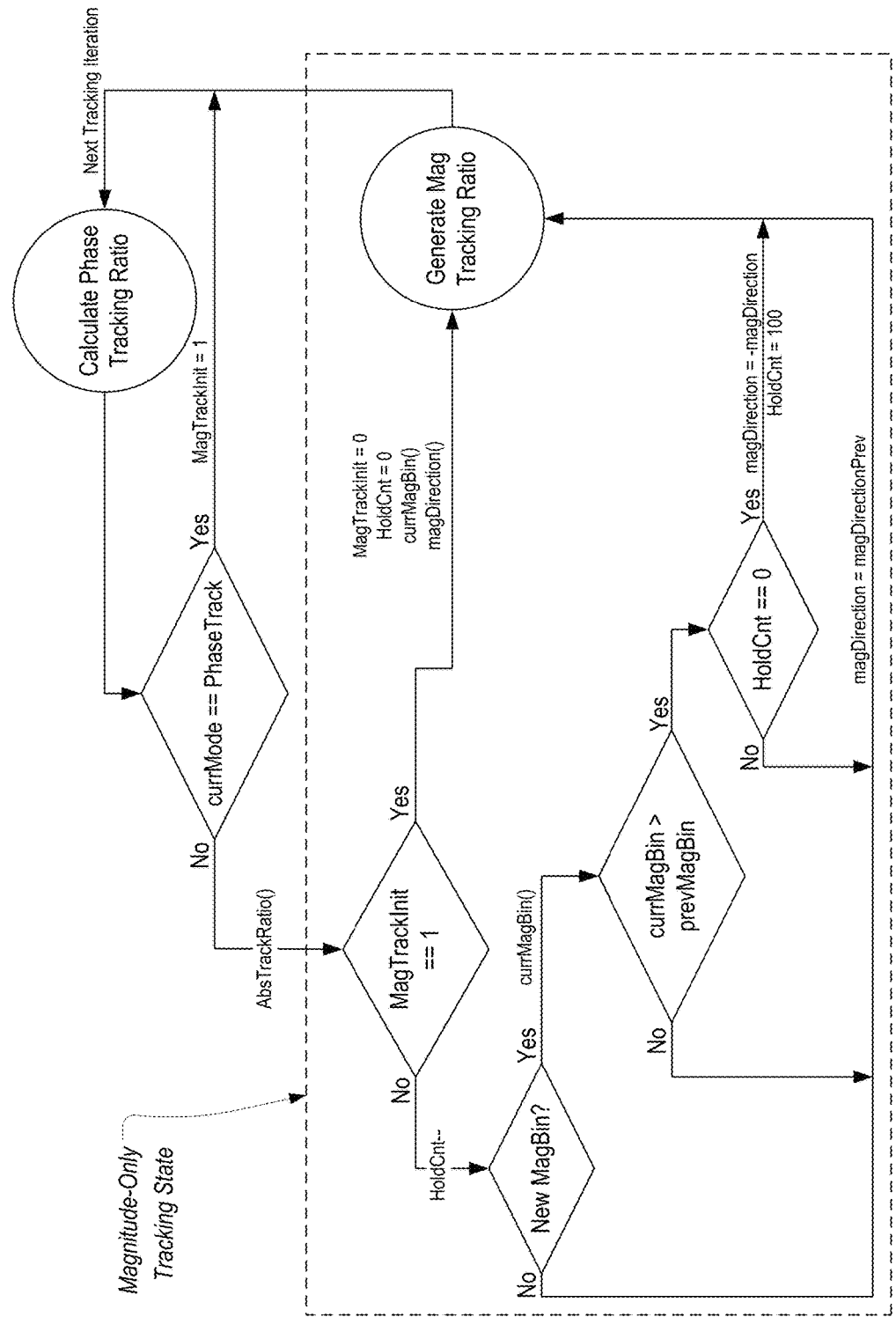
FIG. 11 provides a state diagram of a magnitude-only tracking process.

FIG. 11 provides a flowchart of the process that MDA 203 can implement when performing magnitude-only tracking. As was mentioned above, MDA 203 may perform magnitude-only tracking as part of the hybrid mode described above in which case tracking may switch between phase mode and magnitude-only mode. As indicated by the dashed box, the majority of the process depicted in FIG. 11 can occur as part of the magnitude-only tracking state represented in FIG. 7A (i.e., the process of FIG. 11 can be incorporated into the process of FIGS. 7A and 7B).

For sake of clarity, the "calculate phase tracking ratio" state represents the calculation of the ratios. At this point, these ratios will include a sign and could be used for phase tracking. If, however, magnitude tracking is to be performed, these same signed ratios will be employed as will be described below. In other words, the ratios can be calculated in the same way regardless of whether the ratios will be used to perform phase or magnitude tracking. The "generate mag tracking ratio" state in FIG. 11 is intended to represent the process of applying the correct sign to the magnitude of the ratios that were previously calculated in accordance with the techniques to be described below.

The process in FIG. 11 can be performed independently for each of the azimuth and elevation ratios and can employ a number of parameters including: a MagTrackInit parameter which identifies whether magnitude-only tracking has been initialized, a currMagBin parameter that defines the bin in which the magnitude of the ratio calculated for the current tracking iteration falls, a prevMagBin parameter that defines the most recent bin in which the magnitude of the ratio calculated for the previous tracking iteration (or iterations) fell, a magDirection parameter that represents the current direction in which monopulse antenna 201 is being steered, a magDirectionPrev parameter that represents the direction in which monopulse antenna 201 was steered during a previous iteration (or iterations), and a HoldCnt parameter that represents a period of time that has elapsed since the last change in direction. FIG. 11 also includes a AbsTrackRatio( ) function which can be called to generate the absolute value of the corresponding ratio, a currMagBin( ) function which can be called to set the values of the currMagBin and PrevMagBin parameters, and a magDirection( ) function which can be called to set the values of the magDirection and the magDirectionPrev parameters.

Whenever MDA 203 is performing phase mode tracking (e.g., in accordance with the process depicted in FIG. 7B), the currMode parameter will be set to PhaseTrack which will cause MagTrackInit to be set to 1. The loop between the "calculate phase tracking ratio" state and the "currMode==PhaseTrack" decision block is intended to represent one tracking iteration of the phase mode tracking process. If MDA 203 determines that tracking should transition from phase tracking to magnitude tracking (e.g., as a result of the az_ratio and the el_ratio becoming larger than RT as shown in FIG. 7B), the currMode parameter can be set to MagTrack which will cause a transition to the magnitude-only tracking state. As part of this transition, the magnitude of the current ratio values can be calculated (e.g., by calling AbsTrackRatio( )) so that the sign of the ratios will be ignored during the magnitude-only tracking process (which is made possible due to the techniques disclosed in U.S. patent application Ser. No. 14/572,470). The MagTrackInit parameter will have been set to 1 due to the fact that phase mode tracking was being performed at the previous tracking iteration. This will trigger an initialization step in which the MagTrackInit and HoldCnt parameters are reset to 0 and the bin and direction parameters are set to appropriate values.

This first call to currMagBin( ) can set the value of the currMagBin based on the magnitude of the ratio for the current iteration. For example, if the absolute value of the azimuth ratio was determined to be 0.2, the currMagBin parameter could be set to 4 based on the example in FIG. 10. In some embodiments, the prevMagBin parameter could be initialized to the same value as the currMagBin parameter. The call to magDirection( ) can set the value of magDirection based on the current direction in which monopulse antenna 201 is being steered. For example, assuming a positive value of magDirection represents upward movement while a negative value of magDirection represents downward movement, and monopulse antenna 201 is being steered in upward increments, MDA 203 can set the magDirection parameter to 1 initially. The magDirectionPrev parameter may also be set to this same value.

After this initialization, the next iteration of tracking can be performed by calculating the current azimuth and elevation ratios. As mentioned above, the ratios can initially be calculated as signed values (as part of the calculate phase tracking ratio state). Assuming currMode has not been changed back to PhaseTrack, this next tracking iteration will be performed in the magnitude-only tracking state which will entail generating the absolute value of the ratios. Because this is not the first iteration (i.e., because MagTrackInit was set to 0), the process will proceed to determine whether the magnitude of the current ratio falls within a new ratio bin (or MagBin). Assuming that currMagBin and prevMagBin were initialized to the same value, this determination will yield a negative result. Because the current ratio does not fall in a new ratio bin, MDA 203 can continue to steer monopulse antenna 201 in the same direction. This is accomplished by setting magDirection equal to magDirectionPrev and then using the value of magDirection to generate the sign of the corresponding tracking ratio.

More particularly, the tracking ratio output by MDA 203 when in magnitude-only tracking mode can be calculated as absTrackRatio*sign(magDirection) where absTrackRatio represents the magnitude of the corresponding ratio and sign(magDirection) will generate either a 1 or −1. Therefore, the resulting steering signal (which will be described below) is proportional to the magnitude of the ratio (which implies that monopulse antenna 201 will be steered with less gain when it is closer to the boresight). A positive steering signal will cause monopulse antenna 201 to be steered in a first direction in the corresponding axis (e.g., right or up) while a negative steering signal will cause monopulse antenna 201 to be steered in a second direction opposite the first direction (e.g., left or down).

As can be seen, as long as the ratio remains in the same bin, monopulse antenna 201 will continue to be steered in the same direction. However, if the current ratio falls into a different ratio bin than the previous ratio, MDA 203 can then determine whether the current bin is greater than the previous bin (i.e., whether the ratio is getting larger rather than smaller). As indicated, the call to currMagBin( ) can set the values of the currMagBin and prevMagBin parameters appropriately to allow this determination to be made. For example, prevMagBin can be set to the value of currMagBin which had been previously determined and then currMagBin can be set based on the current magnitude of the ratio. With reference to FIG. 10, if the ratio had previously fallen between 0.05 and 0.1 in previous iterations, currMagBin will have been set to 2. Then, if the ratio drops below 0.05 in the current iteration, prevMagBin can be set to 2 and currMagBin can be set to 1. In such a scenario, currMagBin will not be greater than prevMagBin (which means that monopulse antenna 201 is being steered towards the null) and therefore the direction should not be changed. In contrast, if the current ratio had instead exceeded 0.1, currMagBin would be 3 causing a positive transition from the "currMagBin>prevMagBin" block. The effective result of this processing is that MDA 203 will determine that a change in direction should occur typically only after a number of tracking iterations have been performed (e.g., as the ratio passes through the ratio bin).

Even when employing the ratio bins to determine whether the direction of monopulse antenna 201 should be reversed, it is still possible that MDA 203 would attempt to change the direction faster than is possible due to the inertia of monopulse antenna 201. To account for this, MDA 203 can employ the HoldCnt parameter. In particular, when it is determined that the current ratio falls into a larger ratio bin, it can be determined whether the last change in direction occurred in excess of a defined threshold. If not, MDA 203 will forgo reversing the direction of monopulse antenna 201.

MDA 203 implements this "hold period" by setting the HoldCnt parameter to a specified value whenever a change in direction occurs and then decrementing HoldCnt at each steering iteration. As shown in FIG. 11, if HoldCnt equals 0 after it has been determined that the current ratio falls into a larger ratio bin, the sign of magDirection can be changed which will in turn cause the sign of the tracking ratio to be changed thereby changing the direction in which monopulse antenna 201 will be steered. As part of switching the sign of magDirection, MDA 203 can also set the value of HoldCnt to 100 (or to some other desired value). For example, if a tracking iteration takes 4 ms, setting HoldCnt to 100 will prevent another change in direction until 400 ms have elapsed. At each iteration of magnitude tracking, HoldCnt can be decremented (at least until it reaches 0) as represented by HoldCnt—between the "MagTrackInit=1" and "New MagBin?" blocks.

In some embodiments, rather than employing the HoldCnt parameter to limit how frequently the direction of monopulse antenna 201 can be changed, MDA 203 may employ velocity feedback from monopulse antenna 201. For example, when the direction of monopulse antenna 201 is changed, its velocity in one direction will slow and then increase in the other direction. MDA 203 could be configured to receive velocity feedback from monopulse antenna 201 (or the motors that drive monopulse antenna 201) and can allow a change in direction only after it has been determined that the velocity has reached a steady state (i.e., that the change of the direction of monopulse antenna 201 is not still in process).

In summary, at each tracking iteration, MDA 203 can calculate which ratio bin the magnitude of the current ratio falls in. If the current ratio falls in a ratio bin different from the ratio bin in which the previous ratio fell, MDA 203 can determine whether the current ratio bin is larger than the previous bin (or, more specifically, that the current ratio bin encompasses larger ratio values than the previous ratio bin). If the current ratio bin is larger, MDA 203 can then determine whether sufficient time has elapsed since the last change in direction. If so, the direction of monopulse antenna 201 in the corresponding axis can be changed. In this way, MDA 203 can limit how frequently the steering direction is changed.

To summarize, in magnitude-only tracking mode, MDA 203 can reverse the direction in which monopulse antenna 201 is being steered based on whether the magnitude(s) of the ratio(s) is increasing or decreasing. In some embodiments, MDA 203 can base such a reversal only on the determination of whether the magnitude of a ratio is increasing or decreasing. In other embodiments, however, MDA 203 may employ ratio bins in this process to reduce how frequently the direction of monopulse antenna 201 will be reversed. In further embodiments, MDA 203 may employ ratio bins as well as a hold period to prevent the direction of monopulse antenna 201 from being reversed too soon after a prior reversal in direction. Alternatively, in some embodiments, MDA 203 may employ velocity feedback with or without ratio bins to prevent the direction of monopulse antenna 201 from being reversed too soon after a prior reversal in direction. In some cases, one of these magnitude tracking techniques may be selected based on current operating conditions (e.g., how quickly the target is moving, the size of monopulse antenna 201, etc.).

As mentioned above, the steering signal can be proportional to the magnitude of the corresponding ratio. In other words, MDA 203 can define a fixed mapping between ratio values and steering signal values. When the ratio is smaller, monopulse antenna 201 will be steered with less gain. Likewise, when the ratio is larger, monopulse antenna 201 will be steered with more gain.

Figure 12:
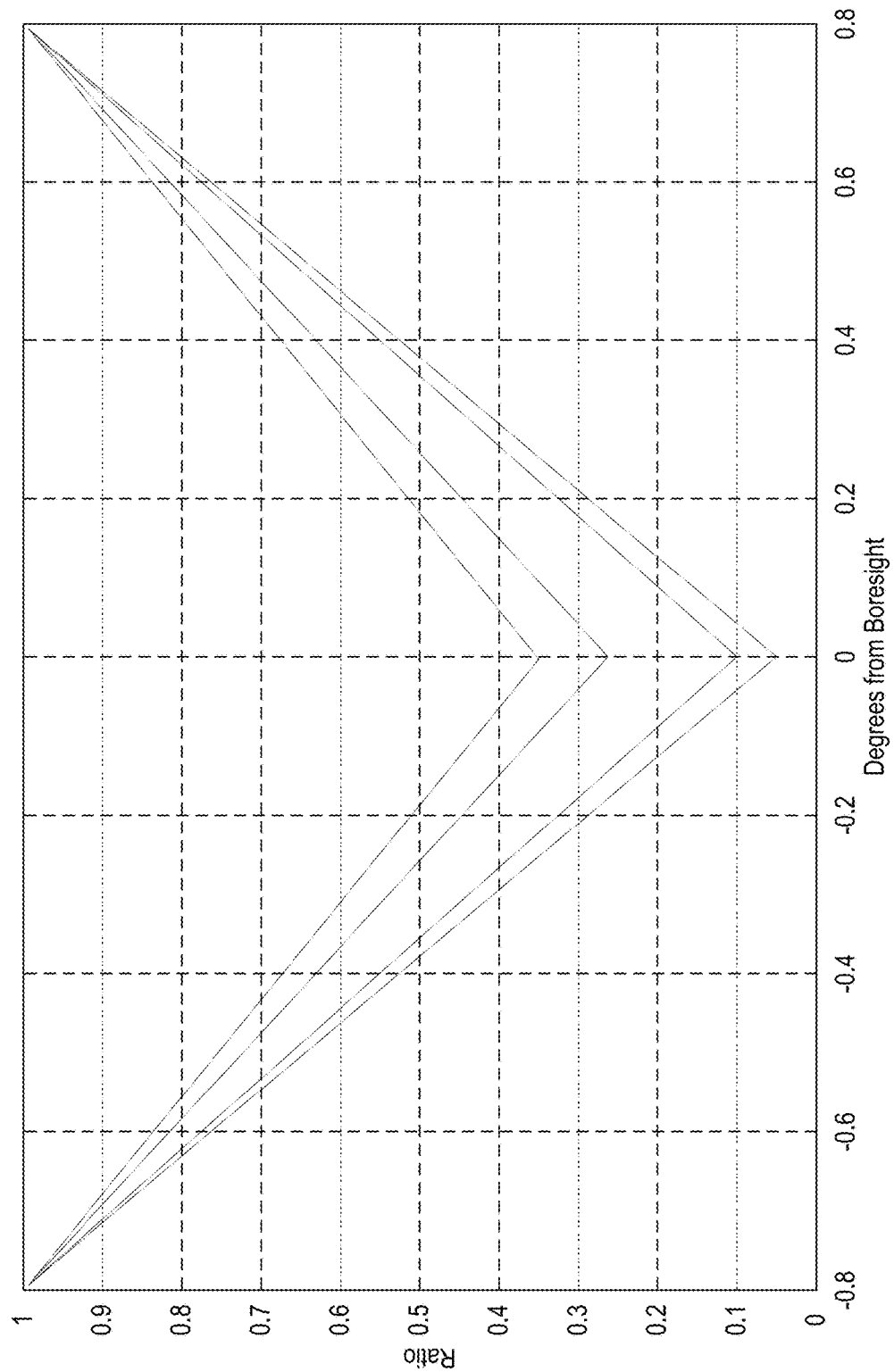
FIG. 12 illustrates how the null-depth of a ratio may vary over frequency or due to distortion.

Unfortunately, basing the magnitude of the steering signal on the magnitude of the ratio creates various difficulties when tracking near the null. For example, the null-depth of the ratio typically varies over frequency. In addition, distortion will also affect the null-depth. FIG. 12 provides an example of how the null-depth of the ratio may vary. In FIG. 12, four different ratios are plotted. These ratios may represent four different frequencies and/or the occurrence of different types of distortion. Importantly, the magnitude of each ratio at the null varies between 0.05 and 0.35 (which are intended to be example numbers only and not actual measured values). Because of this variation in the null-depth, the magnitude of the steering signal that is generated at the null may vary significantly over frequency or in the presence of distortion. For example, when monopulse antenna 201 is aligned with the object to be tracked, the ratio may be 0.05 in one part of a frequency band and 0.35 in another portion of the same band. If MDA 203 is configured to employ fixed mappings based on the ratio null occurring at 0.05 but the ratio during operation has a null that is at 0.35, the magnitude of the steering signal that MDA 203 will produce at the actual null will be substantially larger than it should be. These variations in the null-depth will therefore increase the difficulty of providing an accurate error estimate at the null (e.g., because monopulse antenna 201 will be driven with more gain even when aligned with the object making it difficult to stay within the null). In essence, if the null-depth does not produce a ratio very close to zero (and MDA 203 was configured to map a near zero ratio to a 0° error tracking signal), monopulse antenna 201 will shake back and forth at the null rather than dithering in small increments. In this described example, the gain would be too strong at the null.

Although it is possible to create a fixed mapping for each operational frequency that accounts for the variations in the null-depth, there is no guarantee that the null-depth will be consistent between builds even at the same frequency. It is also difficult, if even possible, to define fixed mappings that account for known types of distortion. Also, defining fixed mappings for each frequency and/or distortion scenario significantly increases the overhead of the approach.

To address the difficulties caused by the variations in the null-depth of the ratio, a mapping technique can be employed in which MDA 203 employs a mapping equation to calculate the magnitude of the tracking error signal based on the magnitude of the ratio. Using this technique, a tracking error signal of substantially the same magnitude will be generated at the null even when the magnitude of the ratio at the null varies. As with the techniques described above, this mapping technique can be performed independently for each of the azimuth and elevation ratios.

To aid in the understanding of this technique, an explanation of various terms will be provided. A "tracking error angle" is the angle of deviation from the null that MDA 203 calculates based on the magnitude of the corresponding ratio (e.g., using the techniques described below). For example, a tracking error angle may define a deviation of 0.5° from the azimuth null. A "tracking error signal" is a value that MDA 203 generates based on the tracking error angle. A "steering signal" can be produced from the tracking error signal and provided as input to the motors that drive monopulse antenna 201. In essence, these values function to convert the ratio into a format that the motors expect and to a value indicative of the antenna's distance from the null. Based on the configuration of monopulse antenna system 200, it is possible that the tracking error angle could be converted directly to a steering signal. Therefore, subject to the following description, the exact manner in which a steering signal is generated may not be essential to the present invention.

In some embodiments, the mapping equation can be in the form of a quadratic equation with coefficients whose values are set based on the particular operational antenna pattern or channel. For example, the mapping equation can be in the form of $$Y = A*X^2 + B*X - C$$

where X is the magnitude of the ratio, A, B, and C are coefficients defined for a particular antenna pattern or channel, and Y is the tracking error angle that will define the magnitude of the corresponding steering signal.

The values of the coefficients may be determined based on measured or theoretical ratio values across the range of tracking errors (e.g., as shown in FIG. 12). In some embodiments, the values of the coefficients can be determined using curve fitting techniques. With the mapping equation, MDA 203 can identify the magnitude of the ratio (X), calculate the tracking error angle (Y) using the appropriate set of coefficients, and then output a corresponding tracking error signal based on the calculated tracking error angle. This same mapping equation can be employed for both the azimuth and elevation ratios by defining sets of coefficients for each azimuth or elevation channel.

Figure 13:
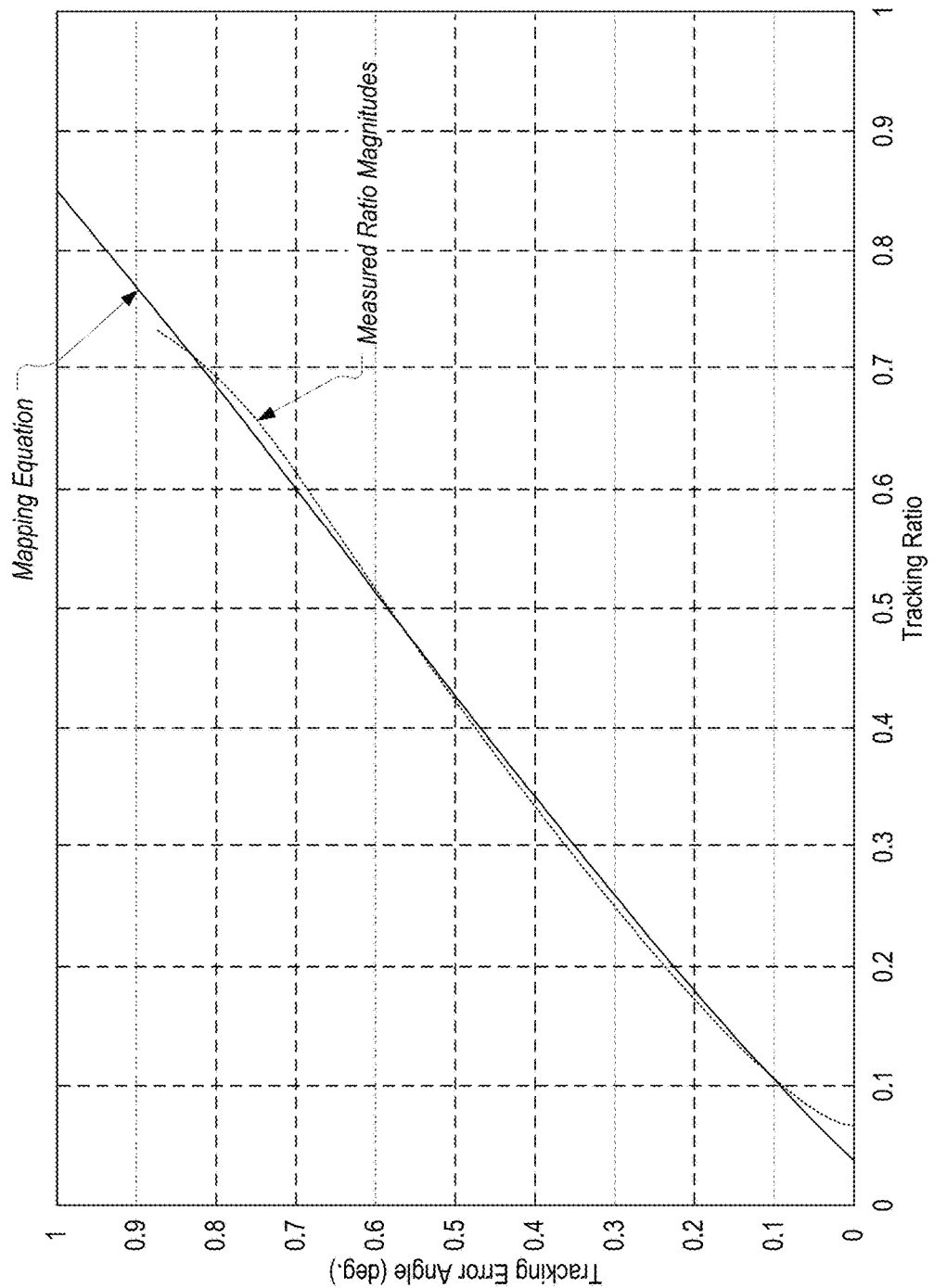
FIG. 13 illustrates how a mapping equation can be employed to generate a tracking error angle to steer a monopulse antenna based on a current magnitude of the corresponding ratio.

FIG. 13 provides an example of how a set of coefficients can be determined for a particular ratio. The graph in FIG. 13 includes a series of points representing the magnitude of the azimuth ratio that was measured at a number of tracking error angles and averaged over frequency. Using these points, curve fitting techniques can be performed to calculate values of A, B, and C for the mapping equation (as represented by the solid line). A similar approach can be employed to generate a set of coefficients for a particular antenna pattern (e.g., widebeam vs. narrowbeam) or channel. MDA 203 can store these sets of coefficients and employ an appropriate set during tracking to output a tracking error signal with a magnitude that represents the tracking error angle. This will allow a single mapping equation to be employed across the various frequencies while still accounting for the variations in the null-depth.

FIG. 13 illustrates that, even when employing a mapping equation, a tracking error angle of 0 will likely never be produced. For example, in FIG. 13, the minimum value of the ratio is approximately 0.066 which would yield a tracking error angle of approximately 0.05 degrees using the mapping equation. However, it may be desirable to minimize the magnitude of the steering signal at the null to avoid unnecessary back and forth movement of monopulse antenna 201. In other words, it is desirable to have the magnitude of the ratio at the null map to a 0° tracking error angle.

In some embodiments of the present invention, a further improvement in the tracking error estimate can be accomplished by dynamically estimating a minimum ratio value and then employing a separate mapping equation offset when the ratio is near this minimum. In essence, this separate mapping equation will comprise a deviation from the curve defined by the mapping equation that would otherwise be employed so that the magnitude of the ratio at the null will be mapped to a tracking error angle of 0° or approximately 0°.

Figure 14:
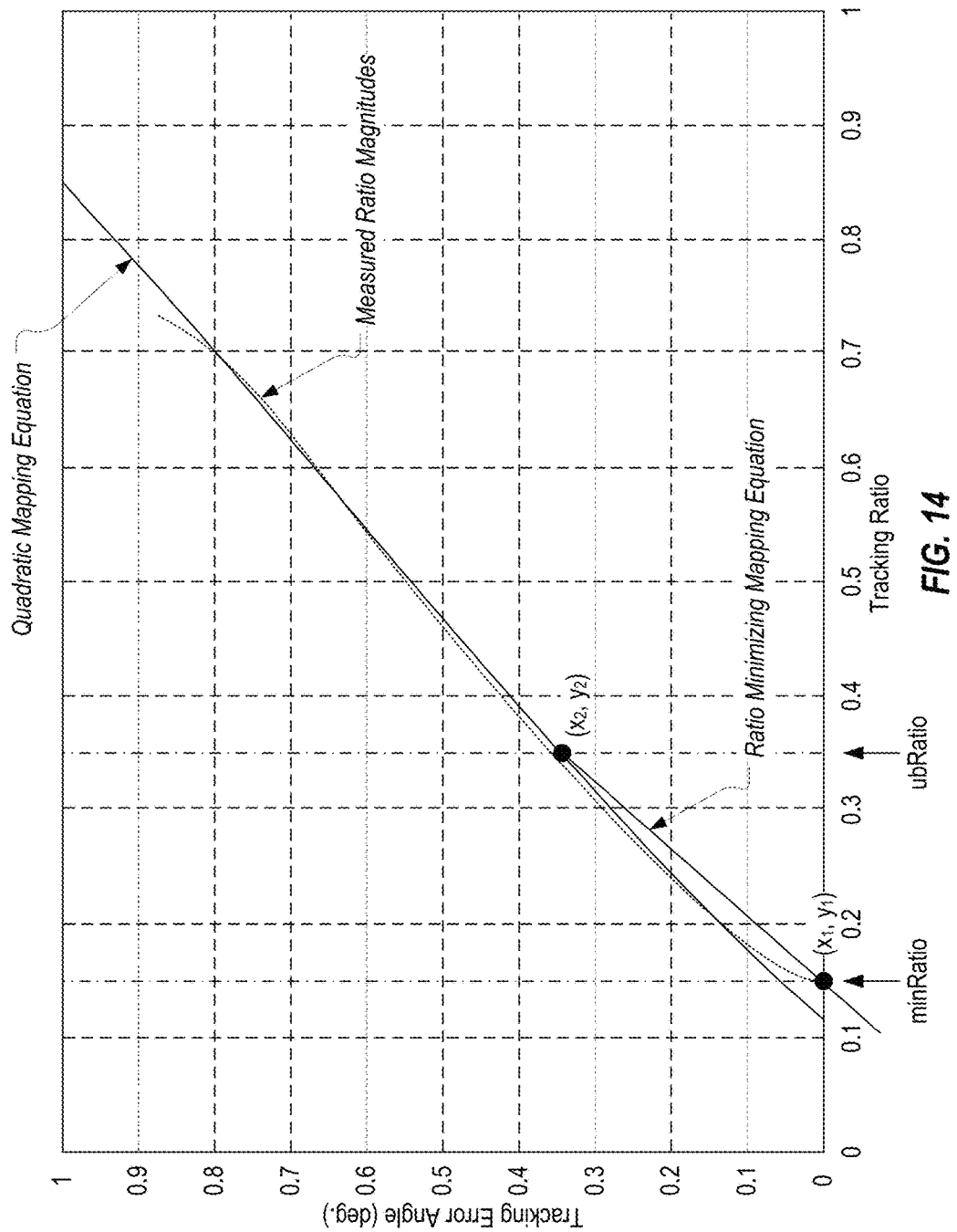
FIG. 14 illustrates how different mapping equations can be selectively employed to generate the tracking error angle based on whether tracking is being performed at or near the null.

FIG. 14 illustrates how this separate mapping can be performed in a case where the minimum magnitude of the azimuth ratio is 0.15. To distinguish between the two mapping equations, the first mapping equation described with reference to FIG. 13 will be referred to as a "quadratic mapping equation" while the second mapping equation will be referred to as a "ratio minimizing mapping equation."

During tracking, MDA 203 can be configured to calculate a minimum ratio over some period of time. For example, if the sample period is 4 ms, MDA 203 may be configured to identify the minimum ratio that occurred over 250 samples (i.e., the minimum ratio over a 1 second period). With reference to FIG. 14, and assuming tracking is being performed at the null, MDA 203 will identify a minimum ratio (minRatio) of 0.15. MDA 203 can then employ the minRatio to generate the ratio minimizing mapping equation based on the formula of a line (m*x+b). In essence, MDA 203 will employ the location of minRatio to generate an equation for a line that will intersect with 0 on the tracking error angle axis at minRatio and then employ this equation to calculate the tracking error angle from the ratio when the ratio is near the null.

As is known, the slope (m) of a line can be defined as $(y_2-y_1)/(x_2-x_1)$. Upon determining the minimum ratio (minRatio) during a period of time (e.g., every second), MDA 203 can employ this minimum ratio as the value of $x_1$. A value of $x_2$ (or upper bound ratio (ubRatio)) can be generated from minRatio such as, for example, $x_2$=minRatio+0.2. Because the goal of the ratio minimizing mapping equation is to map minRatio to a tracking error of 0, the value of $y_1$ can be set to 0. Also, because this line should intersect with the line of the quadratic mapping equation, the value of $y_2$ can be calculated using the quadratic mapping equation and ubRatio as $y_2=a*(ubRatio)^2+b'*(ubRatio)+c$, (where b' in this context refers to the coefficient in the quadratic mapping equation). Solving for b in the line equation will yield $b=y_2-m*ubRatio$. With the values of m and b calculated, the ratio minimizing mapping equation can therefore be defined as:

$$Y = m*X + b$$

where X is the current ratio, m and b are as described above, and Y is the tracking error angle.

Once the minimum ratio has been identified (i.e., once MDA 203 has determined how deep the null is), the ratio minimizing mapping equation can be used to generate the tracking error angle when the current ratio is below ubRatio (e.g., within 0.2 of the minimum ratio), whereas the quadratic mapping equation can be used to generate the tracking error angle when the current ratio is above ubRatio. Accordingly, with reference to FIG. 14, when the current ratio is 0.15, the ratio minimizing mapping equation will be employed which will yield a tracking error angle of 0° rather than a tracking error angle of 0.05° which would have been output by the quadratic mapping equation. Because the depth of the null may vary over time due to potential distortion, or for a change in frequency, MDA 203 can repeatedly estimate minRatio and recalculate the values of the m and b coefficients in the ratio minimizing mapping equation.

In summary, MDA 203 can be configured to selectively employ different mapping equations based on whether tracking is being performed at or near the null. By employing separate equations, the ratio null can be mapped to a 0° degree tracking error angle even when the ratio null may vary across frequencies or due to distortion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for tracking in a monopulse antenna system using a magnitude of a ratio, the method comprising:
   identifying a current magnitude of a ratio generated from a sum and difference channel of a monopulse antenna system;
   determining that the current magnitude of the ratio is larger than a previous magnitude of the ratio; and
   in response to determining that the current magnitude of the ratio is larger than the previous magnitude of the ratio, generating a steering signal that will cause a direction of a monopulse antenna of the monopulse antenna system to be reversed.

2. The method of claim 1, further comprising:
   determining whether a previous change in the direction of the monopulse antenna has been completed; and
   only generating the steering signal when it is determined that the previous change in the direction has been completed.

3. The method of claim 2, wherein determining whether a previous change in the direction of the monopulse antenna has been completed comprises determining that a counter that was set when the previous change in the direction was initiated has lapsed.

4. The method of claim 3, wherein the counter is adjusted at each of a plurality of tracking iterations of the monopulse antenna system.

5. The method of claim 2, wherein determining whether a previous change in the direction of the monopulse antenna has been completed comprises evaluating velocity feedback from the monopulse antenna.

6. The method of claim 5, wherein evaluating the velocity feedback comprises determining that the velocity of the monopulse antenna has reversed direction.

7. The method of claim 1, wherein determining that the current magnitude of the ratio is larger than a previous magnitude of the ratio comprises identifying a current ratio bin in which the current magnitude falls and determining that the current ratio bin is larger than a previous ratio bin in which the previous magnitude fell.

8. The method of claim 1, wherein the ratio is an elevation ratio or an azimuth ratio.

9. The method of claim 1, wherein a magnitude of the steering signal is calculated using a mapping equation.

10. The method of claim 9, wherein the mapping equation is one of multiple mapping equations that is selected based on the current magnitude of the ratio.

11. The method of claim 10, wherein a first mapping equation of the multiple mapping equations is generated based on a minimum magnitude of the ratio that is detected over a period of time.

12. The method of claim 11, wherein a second mapping equation of the multiple mapping equations is a quadratic equation having coefficients that are selected based on an operating condition of the monopulse antenna system.

13. The method of claim 12, wherein the operating condition is determined from an antenna beam pattern or frequency band.

14. A method for generating a steering signal in a monopulse antenna system, the method comprising:
   repeatedly calculating a magnitude of a ratio that is generated from a sum and difference channel of a monopulse antenna system;
   employing the magnitude of the ratio as an input to a mapping equation to generate a magnitude of a steering signal; and
   outputting the steering signal having the magnitude generated by the mapping equation to a monopulse antenna to cause the monopulse antenna to be steered in accordance with the magnitude of the steering signal.

15. The method of claim 14, wherein the mapping equation is a first mapping equation of multiple mapping equations, and wherein the first mapping equation is selected from among the multiple mapping equations based on the magnitude of the ratio.

16. The method of claim 15, wherein the first mapping equation is selected when the magnitude of the ratio is within a specified amount of a previously detected minimum magnitude of the ratio.

17. The method of claim 16, wherein the first mapping equation is a linear equation, and wherein a second mapping equation is selected when the magnitude of the ratio is beyond a specified amount from the previously detected minimum magnitude.

18. The method of claim 17, wherein the second mapping equation is a quadratic equation.

19. A monopulse antenna system comprising:
   a monopulse antenna; and
   a monopulse detector assembly (MDA) that generates a ratio based on sum and difference channels that are generated from outputs of the monopulse antenna;
   wherein the MDA is configured to generate steering signals to steer the monopulse antenna, the MDA generating the steering signals based on a magnitude of the ratio independent of a phase of the ratio.

20. The monopulse antenna system of claim 19, wherein the MDA is configured to generate the steering signals by one or more of:
   employing ratios bins to determine when the magnitude of the ratio is increasing and modifying the steering signals to reverse a direction in which the monopulse antenna is being steered when it is determined that the magnitude of the ratio is increasing; or
   employing one or more mapping equations to generate the steering signals from the magnitude of the ratio.

* * * * *